(12) United States Patent
Miller

(10) Patent No.: US 11,189,152 B2
(45) Date of Patent: Nov. 30, 2021

(54) MULTI-ZONE FILTRATION MONITORING SYSTEMS AND METHODS

(71) Applicant: Donaldson Company, Inc., Minneapolis, MN (US)

(72) Inventor: Danny W. Miller, Ackley, IA (US)

(73) Assignee: Donaldson Company, Inc., Minneapolis, MN (US)

(*) Notice: Subject to any disclaimer, the term of this patent is extended or adjusted under 35 U.S.C. 154(b) by 0 days.

(21) Appl. No.: 16/893,347

(22) Filed: Jun. 4, 2020

(65) Prior Publication Data

US 2020/0388138 A1 Dec. 10, 2020

Related U.S. Application Data

(60) Provisional application No. 62/857,559, filed on Jun. 5, 2019.

(51) Int. Cl.
*G01L 13/00* (2006.01)
*G08B 21/18* (2006.01)

(52) U.S. Cl.
CPC .................. *G08B 21/18* (2013.01)

(58) Field of Classification Search
CPC ...... A61L 31/18; A61L 31/16; A61L 2300/44; A61L 31/10; A61L 2300/00; A61L 2300/416; A61L 2300/45; A61L 2300/608; A61L 31/082; B82Y 15/00; B82Y 20/00; B82Y 25/00; B01L 2300/0825; B01L 2300/0887; B01L 2300/161; B01L 2400/0406; B01L 3/5023; B01L 3/502707; B01L 3/502746; H04R 1/028; H04R 1/1083; H04R 1/406; H04R 2201/023;
(Continued)

(56) References Cited

U.S. PATENT DOCUMENTS

| 4,350,504 A | 9/1982 | Diachuk |
| 5,121,599 A | 6/1992 | Snyder et al. |

(Continued)

FOREIGN PATENT DOCUMENTS

| CN | 100384508 | 4/2008 |
| CN | 100457232 | 2/2009 |

(Continued)

OTHER PUBLICATIONS

File History for U.S. Appl. No. 16/102,277 downloaded Jan. 20, 2021 (288 pages).

(Continued)

*Primary Examiner* — Daniel Previl
(74) *Attorney, Agent, or Firm* — Pauly, DeVries Smith & Deffner LLC

(57) ABSTRACT

Embodiments herein relate to multi-zone filtration monitoring systems and methods. In an embodiment, a filtration monitoring system is included having a plurality of filtration housings, a plurality of filter elements associated with the filter housings, a plurality of wireless communication tags associated with the filter elements, a plurality of zone antennas, and a wireless communication reader in wired communication with the plurality of zone antennas. The reader can be configured to wirelessly send data to and receive data from the wireless communication tags via the zone antennas. Other embodiments are also included herein.

24 Claims, 19 Drawing Sheets

(58) Field of Classification Search
CPC .... H04R 2460/01; H04R 3/005; H04R 5/027; H04R 5/033; H04R 5/0335; H04R 5/04; H04S 2400/01; H04S 7/304; A61B 5/746; A61B 5/0205; A61B 5/021; A61B 5/02116; A61B 5/02125; A61B 5/0215; A61B 5/024; A61B 5/02405; A61B 5/02438; A61B 5/02444; A61B 5/046; A61B 5/0464; A61B 5/0507; A61B 5/076; A61B 5/1076; A61B 5/4836; A61B 5/4839; A61B 5/6805; A61B 5/681; A61B 5/6823; A61B 5/6824; A61B 5/6831; A61B 5/6833; A61B 5/6876; A61B 5/6882; A61B 8/06; A61B 8/0891; A61B 8/12; A61B 8/5223; A61B 8/5292; A61B 8/56; A61F 2/82; A61F 2210/009; A61F 2250/0067; A61F 2/0077; G06K 7/10079; G06K 19/0717; G06K 19/0723; G06K 7/10297; G06Q 10/08; G07C 9/28; A61K 45/06; A61K 51/1262; A61K 51/1286; A61N 1/16; A61N 2/002; A61N 2/06; C01G 11/00; G01N 33/48792; G08B 21/0453; G16H 50/30; H01L 21/00; H01L 29/00; H04B 1/082; H04B 7/0413; H04L 41/12; H04L 45/12; H04M 1/6083; H04M 1/72547; H04M 1/72561; H04Q 2209/47; H04Q 9/00; H04W 76/10; H04W 76/15; H04W 84/18; H04W 88/06
USPC ... 340/626, 10.1, 10.51, 572.1–572.9, 568.1, 340/568.5, 609, 614
See application file for complete search history.

(56) References Cited

U.S. PATENT DOCUMENTS

| | | | |
|---|---|---|---|
| 5,279,609 A * | 1/1994 | Meckler | F24F 3/1423 236/49.3 |
| 6,051,144 A | 4/2000 | Clack et al. | |
| 6,551,503 B2 | 4/2003 | Niers et al. | |
| 6,652,614 B2 | 11/2003 | Gieseke et al. | |
| 6,782,240 B1 * | 8/2004 | Tabe | H04B 1/082 455/344 |
| 6,936,160 B2 | 8/2005 | Moscaritolo et al. | |
| 7,052,525 B2 | 5/2006 | Kang et al. | |
| 7,223,364 B1 * | 5/2007 | Johnston | B01L 3/5023 422/502 |
| 7,901,570 B2 | 3/2011 | Grzonka et al. | |
| 8,029,679 B2 | 10/2011 | Grzonka et al. | |
| 8,319,694 B2 | 11/2012 | Yang et al. | |
| 8,336,292 B2 | 12/2012 | Bloms et al. | |
| 8,570,156 B2 | 10/2013 | Barvick et al. | |
| 8,646,695 B2 | 2/2014 | Worrall et al. | |
| 8,717,244 B2 | 5/2014 | Joyce, Jr. et al. | |
| 9,541,429 B2 | 1/2017 | Farokhi et al. | |
| 10,427,082 B2 | 10/2019 | Miller et al. | |
| 10,702,823 B2 | 7/2020 | Miller et al. | |
| 2004/0079693 A1 | 4/2004 | Hacker et al. | |
| 2005/0150304 A1 | 7/2005 | Gustafson et al. | |
| 2006/0124738 A1 * | 6/2006 | Wang | G06K 7/10079 235/385 |
| 2008/0012710 A1 * | 1/2008 | Sadr | G06K 7/10356 340/572.1 |
| 2008/0143488 A1 * | 6/2008 | Yamamoto | G06K 19/07749 340/10.51 |
| 2009/0064774 A1 | 3/2009 | Panzer et al. | |
| 2009/0261659 A1 * | 10/2009 | Carrick | G06K 7/0008 307/82 |
| 2010/0115920 A1 | 5/2010 | Bloms et al. | |
| 2010/0247426 A1 | 9/2010 | Wallace et al. | |
| 2011/0062060 A1 | 3/2011 | Royal et al. | |
| 2012/0132573 A1 | 5/2012 | Lautzenheiser et al. | |
| 2013/0216673 A1 | 8/2013 | Storek et al. | |
| 2013/0220900 A1 * | 8/2013 | Milvert | B01D 35/143 210/85 |
| 2013/0251626 A1 | 9/2013 | Wallace et al. | |
| 2013/0342319 A1 * | 12/2013 | Rimai | G06K 19/07327 340/10.1 |
| 2014/0083766 A1 * | 3/2014 | Tips | E21B 44/00 175/24 |
| 2014/0260989 A1 | 9/2014 | Sukhman et al. | |
| 2015/0290572 A1 | 10/2015 | Stoner, Jr. et al. | |
| 2015/0369717 A1 | 12/2015 | Twiss | |
| 2016/0045854 A1 | 2/2016 | Hung et al. | |
| 2016/0046502 A1 | 2/2016 | Rice | |
| 2016/0048142 A1 | 2/2016 | Chan et al. | |
| 2016/0166954 A1 | 6/2016 | Peleg et al. | |
| 2016/0369797 A1 | 12/2016 | Pribanic et al. | |
| 2017/0050130 A1 * | 2/2017 | Bippus | F25D 23/126 |
| 2017/0050139 A1 | 2/2017 | Schrage et al. | |
| 2017/0080363 A1 | 3/2017 | Krause et al. | |
| 2018/0117508 A1 | 5/2018 | Paluszewski et al. | |
| 2018/0172661 A1 | 6/2018 | Spengler et al. | |
| 2018/0173505 A1 | 6/2018 | Yan | |
| 2018/0186655 A1 | 7/2018 | Cobb et al. | |
| 2019/0054411 A1 | 2/2019 | Miller et al. | |
| 2019/0076760 A1 | 3/2019 | Surdick et al. | |
| 2019/0167188 A1 * | 6/2019 | Gifford, III | A61B 8/5292 |
| 2019/0298208 A1 * | 10/2019 | Weinstein | A61B 5/02125 |
| 2019/0306030 A1 * | 10/2019 | Chen | H04B 7/0413 |
| 2020/0009491 A1 | 1/2020 | Miller et al. | |
| 2020/0298166 A1 | 9/2020 | Miller et al. | |

FOREIGN PATENT DOCUMENTS

| | | |
|---|---|---|
| CN | 104801099 | 7/2015 |
| CN | 104941302 | 9/2015 |
| CN | 104941303 | 9/2015 |
| CN | 105396365 | 3/2016 |
| CN | 105611987 | 5/2016 |
| CN | 106999811 | 8/2017 |
| DE | 102013004112 | 9/2014 |
| EP | 1830173 | 9/2007 |
| EP | 3029388 | 6/2016 |
| EP | 3133049 | 2/2017 |
| EP | 3315183 | 5/2018 |
| WO | 2009033923 | 3/2009 |
| WO | 2012018965 | 2/2012 |
| WO | 2014203378 | 12/2014 |
| WO | 2015002307 | 1/2015 |
| WO | 2016011580 | 1/2016 |
| WO | 2016096786 | 6/2016 |
| WO | 2017030809 | 2/2017 |
| WO | 2017112547 | 6/2017 |
| WO | 2017192729 | 11/2017 |
| WO | 2019036542 | 2/2019 |
| WO | 2020247813 | 12/2020 |

OTHER PUBLICATIONS

File History for U.S. Appl. No. 16/572,246 downloaded Jan. 20, 2021 (681 pages).
File History for U.S. Appl. No. 16/898,106 downloaded Jan. 20, 2021 (345 pages).
"International Preliminary Report on Patentability," for PCT Application No. PCT/US2018/046810 dated Feb. 27, 2020 (12 pages).
"International Search Report and Written Opinion," for PCT Application No. PCT/US2018/046810 dated Nov. 16, 2018 (19 pages).
"International Search Report and Written Opinion," for PCT Application No. PCT/US2020/036413 dated Oct. 28, 2020 (19 pages).
"Invitation to Pay Additional Fees," for PCT Application No. PCT/US2020/036413 dated Sep. 7, 2020 (14 pages).
"First Office Action," for Chinese Patent Application No. 201880053222.6 dated May 31, 2021 (24 pages) with English translation.
"International Preliminary Report on Patentability," for PCT Application No. PCT/US2019/051768 dated Apr. 1, 2021 (9 pages).

(56) References Cited

OTHER PUBLICATIONS

"Notice of Allowance," for U.S. Appl. No. 16/898,106 dated Apr. 29, 2021 (12 pages).

* cited by examiner

MULTI-ZONE FILTRATION MONITORING SYSTEMS AND METHODS

This application claims the benefit of U.S. Provisional Application No. 62/857,559, filed Jun. 5, 2019, the contents of which are herein incorporated by reference in its entirety.

FIELD

Embodiments herein relate to filtration monitoring systems and methods. More specifically, embodiments herein relate to multi-zone filtration monitoring systems and methods.

BACKGROUND

Fluid streams can carry particulate material or other contaminants therein. In many instances, it is desirable to remove some or all of the particulate material from a fluid flow stream. For example, air intakes or fuel lines for engines for motorized vehicles or power generation equipment, gas streams directed to gas turbines, air streams to various combustion furnaces, and the like often include particulate material or other contaminants therein. If the particulate material or contaminants reaches the internal workings of the various mechanisms involved, it can cause substantial damage. Therefore, a variety of filtration systems including air filters, fuel filters, gas filters and the like have been developed for particulate and/or contaminant removal.

Many filter systems may require periodic monitoring and maintenance such as replacement and/or servicing of filter elements at intervals to assure proper operation.

SUMMARY

Embodiments herein relate to multi-zone filtration monitoring systems and methods. In an embodiment, a filtration monitoring system is included having a plurality of filtration housings, a plurality of filter elements associated with the filter housings, a plurality of wireless communication tags associated with the filter elements, a plurality of zone antennas, and a wireless communication reader in wired communication with the plurality of zone antennas. The reader can be configured to wirelessly send data to and receive data from the wireless communication tags via the zone antennas.

In an embodiment, a filtration system is included having a plurality of filtration housings configured to receive filter elements, a plurality of zone antennas configured to wirelessly communicate with wireless communication tags associated with the filter elements, and a wireless communication reader in wired communication with the plurality of zone antennas configured to control communication with the wireless communication tags.

In an embodiment, a vehicle sensor system is included having a plurality of zone antennas, a wireless communication reader in wired communication with the plurality of zone antennas, a plurality of wireless communication tags in wireless communication with the zone antennas, and a filtration housing. At least one of the wireless communication tags can be associated with the filtration housing. At least one of the wireless communication tags and zone antennas can be positioned with a measurement zone disposed therebetween, wherein the measurement zone impacts the signal strength of communication between the wireless communication tag and a zone antenna.

In an embodiment, a method of monitoring filtration system operations is included, the method including receiving signals from a plurality of wireless communication tags with a plurality of zone antennas associated with a plurality of zones and conveying the signals from the zone antennas to a wireless communication reader.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
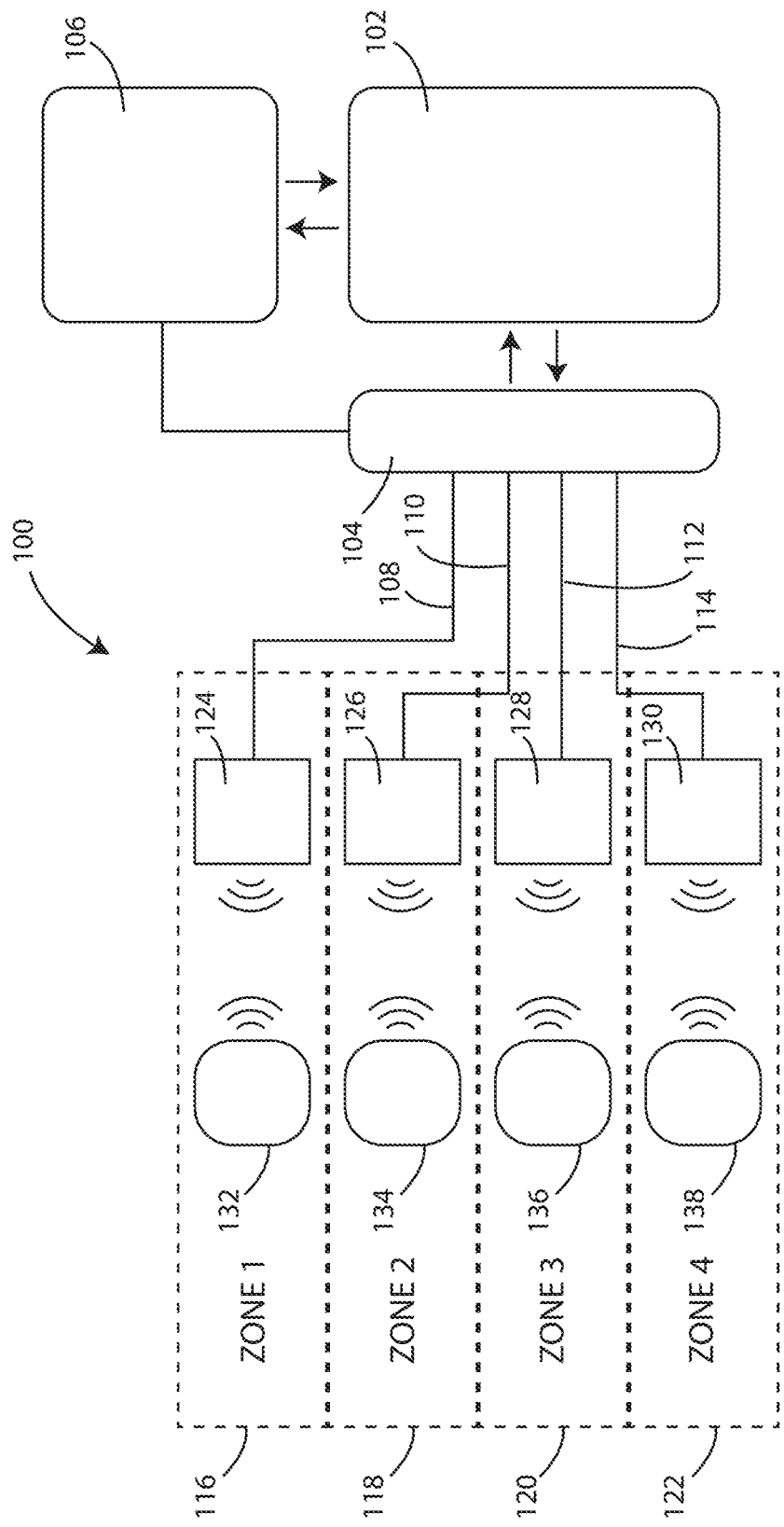
FIG. 1 is a schematic view of a filtration monitoring system in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As referenced above, many filter systems may require periodic monitoring and maintenance such as replacement and/or servicing of filter elements at intervals to assure proper operation.

In some embodiments herein, wireless communication tags can be associated with elements of a filtration system and provide data relevant for monitoring the operation of the filtration system and/or maintenance of the filtration system. For example, wireless communication tags can be associated with filter elements and/or sensing elements of filtration system can provide data relevant for monitoring the operation of the filtration system and/or maintenance of the filtration system.

In various embodiments herein, multiple wireless communication tags may be used for monitoring the operation of a filtration system or systems as part of an overall monitoring/maintenance system. For example, in the context of a vehicle, there may be an air filtration system, a fuel filtration system, an oil filtration system, a cabin air filtration system, an exhaust filtration system, various sensing systems and the like. While these different filtration systems may operate largely independently of one another, these different filtration and/or sensing systems may all be monitored and/or all require periodic maintenance including replacement and/or servicing of filter elements or other elements thereof.

In some scenarios, these different filtration systems may all be monitored separately with separate monitoring systems. However, in various embodiments herein, different filtration systems can be monitored with a single monitoring system. The different filtration systems can, in some cases, be in different physical zones. In some scenarios, different wireless communication reader units can be placed in different zones. However, wireless communication reader units can be relatively costly. As such, in various embodiments herein, a central wireless communication reader can be used that is in wired communication with a plurality of zone antennas. The zone antennas can be used to wirelessly interface with wireless communication tags. The zone antennas can be disposed within particular physical zones and can be in sufficient proximity to communicate with one or more wireless communication tags within each physical zone. In some cases, the wireless communication tags can be associated with equipment other than just filtration systems, such as sensor systems.

The zone antennas can form components of distinct communication channels, the reader further comprising a multiplexer to switch between distinct communication channels. The distinct communication channels can be associated with different filtration housings. The distinct communication channels can be associated with different filtration zones.

Referring now to FIG. 1, a schematic view is shown of a filtration monitoring system 100 in accordance with various embodiments herein. The filtration monitoring system 100 can include a wireless communication reader 102. The filtration monitoring system 100 can also include a multiplexer 104 (or similar hardware component) providing selective wired communication between the wireless communication reader 102 and a first wire 108 (conductor) and a first zone antenna 124. In some cases, the multiplexer 104 can be controlled by a system control module 106, which can also be in communication with the wireless communication reader. The first zone antenna 124 can be within a first zone 116 and can communicate wirelessly with a first wireless communication tag 132, at least when the first wireless communication tag 132 is located within the first zone 116.

Each wireless communication tag can include a unique identification or serial number (e.g., a unique tag ID). The wireless communication tag can send a signal including its unique tag ID. In various embodiments, the system is configured to store data in memory (which can be a part of the wireless communication reader, the system control module, or another component) including unique tag IDs, the zones the unique tag IDs have been located in, and, in some cases, timestamps regarding the same. The combination of tag IDs and specific zones can be referred to as zone association data. In some embodiments, the system can be configured to store a record of some or all zone associations. Storage of the data can be at the level of various system components. By way of example, in some embodiments such data can be stored at the level of the wireless communication tag in electronic memory thereof (volatile or non-volatile) or in memory the wireless communication tag is directly connected to. In some embodiments, such data can also be stored within another component of the system. By way of example, such data can be stored at the level of the wireless communication reader 102 or the system control module 106, another system component, or a memory module in electronic communication with any of these components. In some embodiments, the data is stored in multiple locations redundantly. In some embodiments, the data is passed along to another system, such as a vehicle ECU system and/or out through a data network to a remote location.

Communications between wireless communication tags and zone antennas can follow various patterns. In some embodiments, the wireless communication reader can initiate an interrogation signal to be sent from a zone antenna and a wireless communication tag within range can respond with a signal. In some embodiments, the interrogation signal includes information specific for a particular wireless communication tag (such as specified by its unique ID). In other embodiments, the interrogation signal can be a non-specific interrogation signal eliciting responses from any wireless communication tags that receive it. However, in some embodiments, the wireless communication tags may initiate communication or otherwise advertise their presence by sending a signal in the absence of receiving an interrogation signal.

The strength of emitted interrogation signals from zone antennas can vary. In some embodiments, the strength of emitted interrogation signals can be about 0.1, 0.5, 1, 2, 5, 7.5, 10, 20, 30, 50, 75, 100, 200, 300, or 500 Watts, or an amount falling within a range between any of the foregoing.

In some embodiments, data security protocols can also be executed. By way of example, in some embodiments, the wireless communication tag can be authenticated to the wireless communication reader and/or the wireless communication reader can be authenticated to the wireless communication tag. In some embodiments, such an authentication is required before substantive data, such as zone association data or sensor data is exchanged between the two.

The multiplexer 104 (or similar hardware component) can also provide selective wired communication between the wireless communication reader 102 and a second wire 110 (conductor) and a second zone antenna 126. The second zone antenna 126 can be within a second zone 118 and can communicate wirelessly with a second wireless communication tag 134, at least when the second wireless communication tag 134 is located within the second zone 118.

The multiplexer 104 (or similar hardware component) can also provide selective wired communication between the wireless communication reader 102 and a third wire 112 (conductor) and a third zone antenna 128. The third zone antenna 128 can be within a third zone 120 and can communicate wirelessly with a third wireless communication tag 136, at least when the third wireless communication tag 136 is located within the third zone 120.

The multiplexer 104 (or similar hardware component) can also provide selective wired communication between the wireless communication reader 102 and a fourth wire 114 (conductor) and a fourth zone antenna 130. The fourth zone antenna 130 can be within a fourth zone 122 and can communicate wirelessly with a fourth wireless communication tag 138, at least when the fourth wireless communication tag 138 is located within the fourth zone 122.

Thus, in some embodiments the wireless communication reader can be in wired communication with the plurality of zone antennas and the reader can be configured to wirelessly send data to and receive data from the wireless communication tags via the zone antennas.

In various embodiments, the wireless communication reader can calculate a signal strength between the antennas and the wireless communication tags. For example, the wireless communication reader can calculate an RSSI (received signal strength indicator) value. RSSI is frequently measured in units of decibels per milliwatt (dBm). In some embodiments, typical RSSI values can be about −10, −15, −20, −25, −30, −35, −40, −45, −50, −55, −60, −65, −70, −75, −80, −85, −90, −95, or −100 dBm. In some embodiments, one or more of the foregoing RSSI values can be used a threshold for presence within a particular zone. For example, if the RSSI value falls below the selected threshold, then the wireless communication can be deemed to be out of the zone. Signal strength can follow a known pattern of attenuation based on distance between the zone antenna and the wireless communication tag. As such, in some embodiments, the signal strength reflects a distance between the zone antennas and the wireless communication tags. The wireless communication reader, or another component in communication therewith such as a system control module, can calculate a distance between the zone antennas and the wireless communication tags.

In some embodiments, the wires 108, 110, 112, and 114 can be the same. However, in some embodiments, the wires can have properties that are different from one another. For example, in some embodiments the wires can have the same resistance or impedance.

However, in other embodiments, the wires can have a different resistance or impedance (based on a different overall length, wire gauge, wire type, etc.) and the difference in resistance or impedance (or another electrical property) between one wire and the next can be used by the wireless communication reader 102 or another system component to distinguish one from another. In some embodiments, the electrical properties of the wired communication between the wireless communication reader and the zone antennas distinguishably varies. In some embodiments, the electrical properties of the wired communication between the wireless communication reader and the zone antennas distinguishably varies based on electrical properties of the electrical conductors interconnecting the wireless communication reader and the zone antennas.

Exemplary wires can include, but are not limited to, those with copper, aluminum, or other metals as the conductor. Exemplary wires can include those of various gauges.

In some embodiments, the zone antennas 124, 126, 128, and 130 can be the same. However, in some embodiments, the zone antennas can be different from one another. In some embodiments, at least one of the zone antennas is different in its effective communication range. In some embodiments, at least one of the zone antennas has a directionality that is different than one or more of the other antennas. In some embodiments the zone antennas can be directional, omnidirectional, or isotropic. In some embodiments, one or more zone antennas can be a circular polarized antenna (such as a right hand circular polarized—RHCP or a left hand circular polarized—LHCP). In some embodiments, one or more zone antennas can be a linear polarized antenna. In some embodiments, the zone antennas can be ¼ wavelength, ½ wavelength, monopole, dipole, fractal, array, loop, conical, aperture, traveling wave, and the like. In some embodiments, the antenna can be of a type such as a chip, stamped metal, PCB trace, helical, puck, ceramic patch, flat bar, dome, flat patch, whip, or planar inverted-F antenna.

Exemplary zone antennas are described in U.S. Pat. Nos. 8,319,694 and 8,570,156, the content of which related to antennas including UHF antennas is herein incorporated by reference.

In some embodiments, the wireless communication type/frequency/protocol can be the same between all wireless communication tags and zone antennas. However, in other embodiments, the wireless communication type/frequency/protocol can be different between at least some different wireless communication tags and zone antennas. Exemplary wireless frequencies are protocols are described in greater detail below.

Wireless communication tags herein can include various components including, but not limited to, an antenna (which can function to send and receive signals as well as receive power wirelessly), memory storage (RAM, ROM, EEPROM, flash memory or various other types of non-volatile memory), a control circuit, a power supply circuit (which can, in some cases including a battery and/or capacitors), a telemetry or communication circuit, a sensor device (such as any described herein), and the like. Exemplary wireless communication tags are described in U.S. Pat. Nos. 8,646,695 and 8,717,244, the content of which related to wireless communication tags such as RFID tags is herein incorporated by reference.

The maximum distance of communication between a zone antenna and a wireless communication tag can vary based on factors such as the antenna design, the frequency of wireless communication, the wireless communication protocol, and the like. However, in various embodiments herein, the maximum distance can be about 1, 2, 3, 4, 5, 10, 20, or 50 meters, or an amount falling within a range between any of the foregoing.

The system control module 106 can include various circuitry for telemetry, storage and/or processing of data (including RAM/ROM, EEPROM, and/or data registers), power storage and/or modulation, and the like. In some embodiments the system control module 106 can include a microprocessor, a microcontroller, an application specific integrated circuit (ASIC), or the like. In some embodiments the system control module 106 can include or can be a PIC (peripheral interface controller) microcontroller. However, in some embodiments elements described above with respect to the system control module 106 can be integrated into the wireless communication reader 102. Though not shown in FIG. 1, in some embodiments, the system control module 106 and/or the wireless communication reader 102 can be interfaced with a CANBUS network (controller area network) on a vehicle in order to provide and/or receive information, such as vehicle engine information, mileage information, engine running time, and the like.

In various embodiments, the system controller (or another system component) can be configured to receive electrical signals from the wireless communication reader and the system controller can be configured to identify patterns in the electrical signals received from the wireless communication reader. By way of example, the system controller can be configured to identify patterns indicative of a filtration system operational event. Exemplary filtration system operational events can include, but are not limited to, a filter element removal event, a filter element installation event, a filter element reinstallation event, and a filter cleaning event. In some embodiments, the system controller can be configured to identify patterns in the electrical signals received from the wireless communication reader wherein detection of a wireless communication tag exiting a zone and then reentering a zone is counted as a filter element removal and/or a filter reinstallation event. In some embodiments, exiting a zone can be determined by observing signal strength follow a pattern of decline (such as when the wireless communication tag is moved toward a zone boundary) and then termination (such as when the wireless communication tag is sufficiently outside of a zone such that the zone antenna and the wireless communication tag can no longer communicate).

In some embodiments, exiting a zone can be determined by observing signal strength follow a pattern of termination (such as when the wireless communication tag is sufficiently outside of a zone such that the zone antenna and the wireless communication tag can no longer communicate) that lasts longer than a threshold amount of time. The threshold amount of time can be about 1, 2, 3, 4, 5, 10, 30, 60, 90, 120, 180, 240, 360, or 720 seconds, or an amount of time falling within a range between any of the foregoing.

In some embodiments, data from sensors can be combined with signal strength analysis in order to identify patterns consistent with filtration system operational events. For example, in some embodiments, a filter cleaning event can be determined by observing exiting of a zone (such as through patterns described above) and then, using data from a pressure sensor, observing a pressure drop after reinstallation that is less than the pressure drop was prior to the when the filter exited the zone (e.g., a downward step change in observed pressure drop).

In some embodiments, the system can be configured to increment and store a count of detected filter element removal and/or reinstallation events. In some embodiments, the count of detected filter element removal or reinstallation events configured to be stored in a memory circuit that is part of the wireless communication tag.

It will be appreciated that in some embodiments switching functionality can be built-in to the wireless communication reader 102 and a separate multiplexer is not needed.

Figure 2:
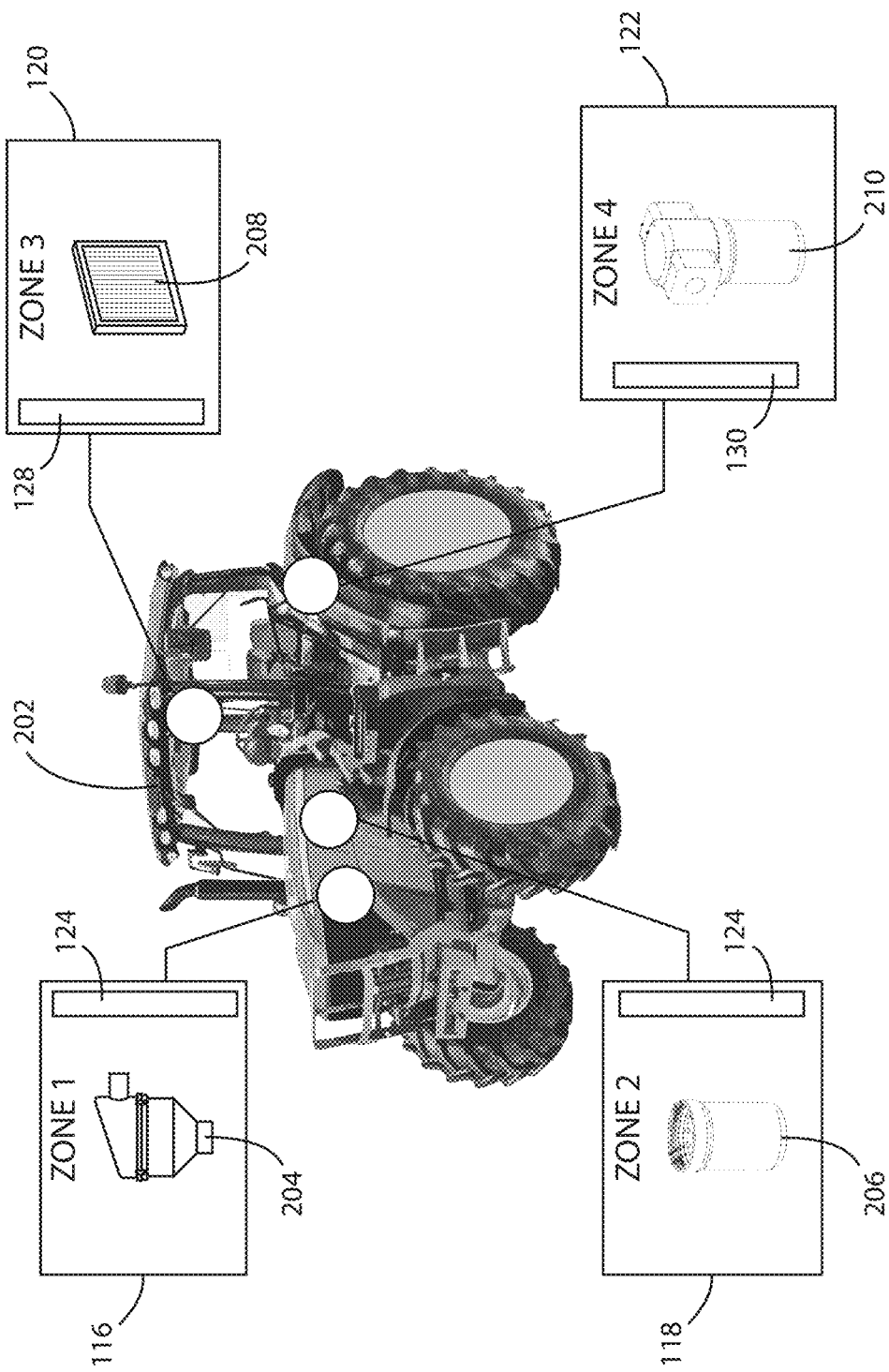
FIG. 2 is a schematic view of a vehicle including a filtration monitoring system in accordance with various embodiments herein.

Referring now to FIG. 2, a schematic view is shown of a vehicle 202 including a filtration monitoring system in accordance with various embodiments herein. The first zone 116 can include an air intake filtration system 204. The air intake filtration system 204 can include a wireless communication tag (not shown) that can wirelessly communicate with a first zone antenna 124.

The second zone 118 can include a fuel filtration system 206. The fuel filtration system 204 can include a wireless communication tag (not shown) that can wirelessly communicate with a second zone antenna 126.

The third zone 120 can include a cabin air filtration system 208. The fuel filtration system 204 can include a wireless communication tag (not shown) that can wirelessly communicate with a third zone antenna 128.

The fourth zone 122 can include a lubricating oil filtration system 210. The fuel filtration system 204 can include a wireless communication tag (not shown) that can wirelessly communicate with a fourth zone antenna 130.

While FIGS. 1 and 2 show a filtration monitoring system having four zones, it will be appreciated that filtration monitoring systems herein can have a greater or lesser number of zones. For example, filtration monitoring systems herein can have 1, 2, 3, 4, 5, 6, 7, 8, 9, 10, or more different zones.

Figure 3:
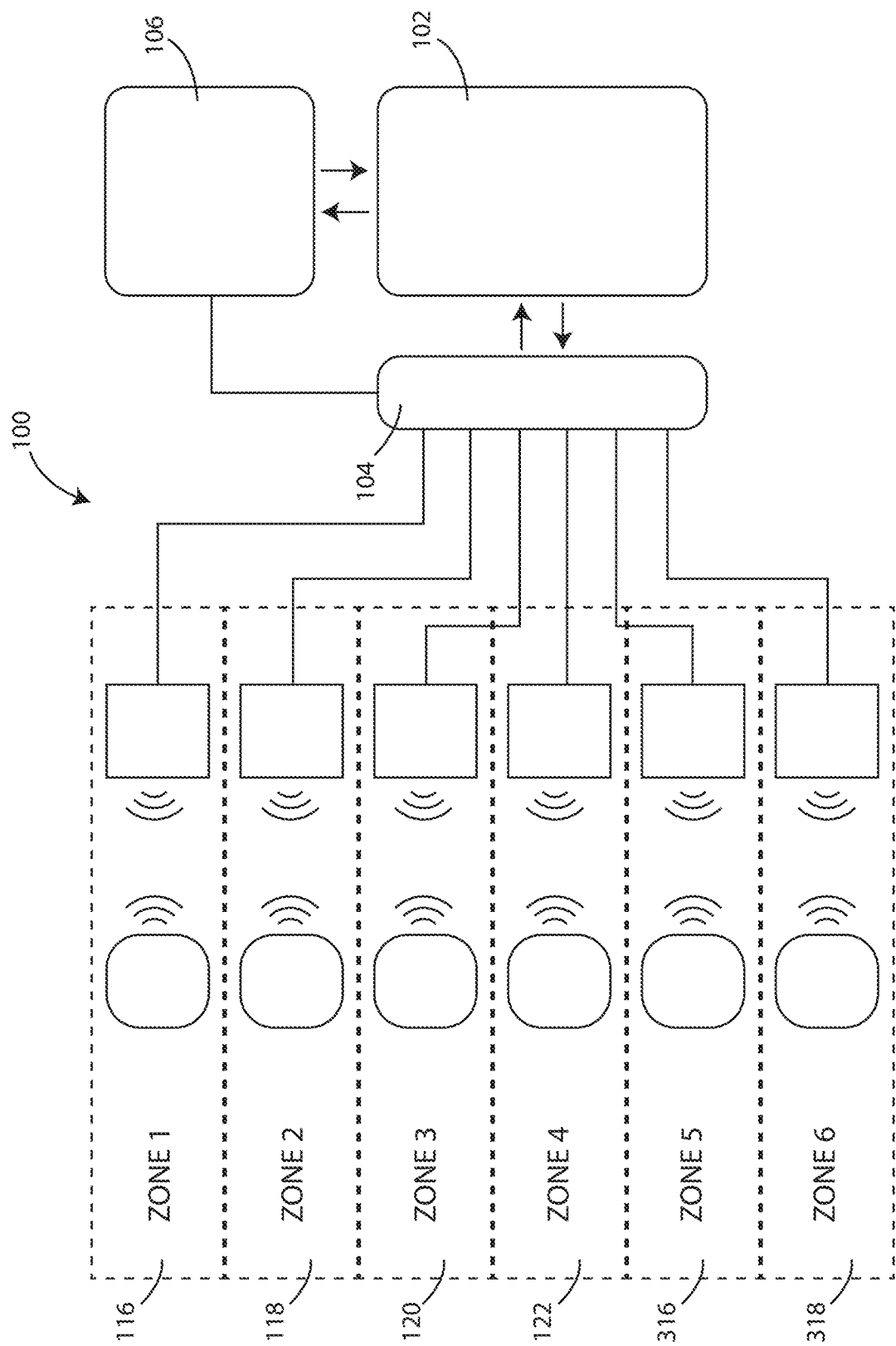
FIG. 3 is a schematic view of a filtration monitoring system in accordance with various embodiments herein.

Referring now to FIG. 3, a schematic view is shown of a filtration monitoring system 100 in accordance with various embodiments herein. The filtration monitoring system 100 can include a first zone 116, second zone 118, third zone 120, and fourth zone 122, and associated components as described above with respect to FIG. 1.

Figure 4:
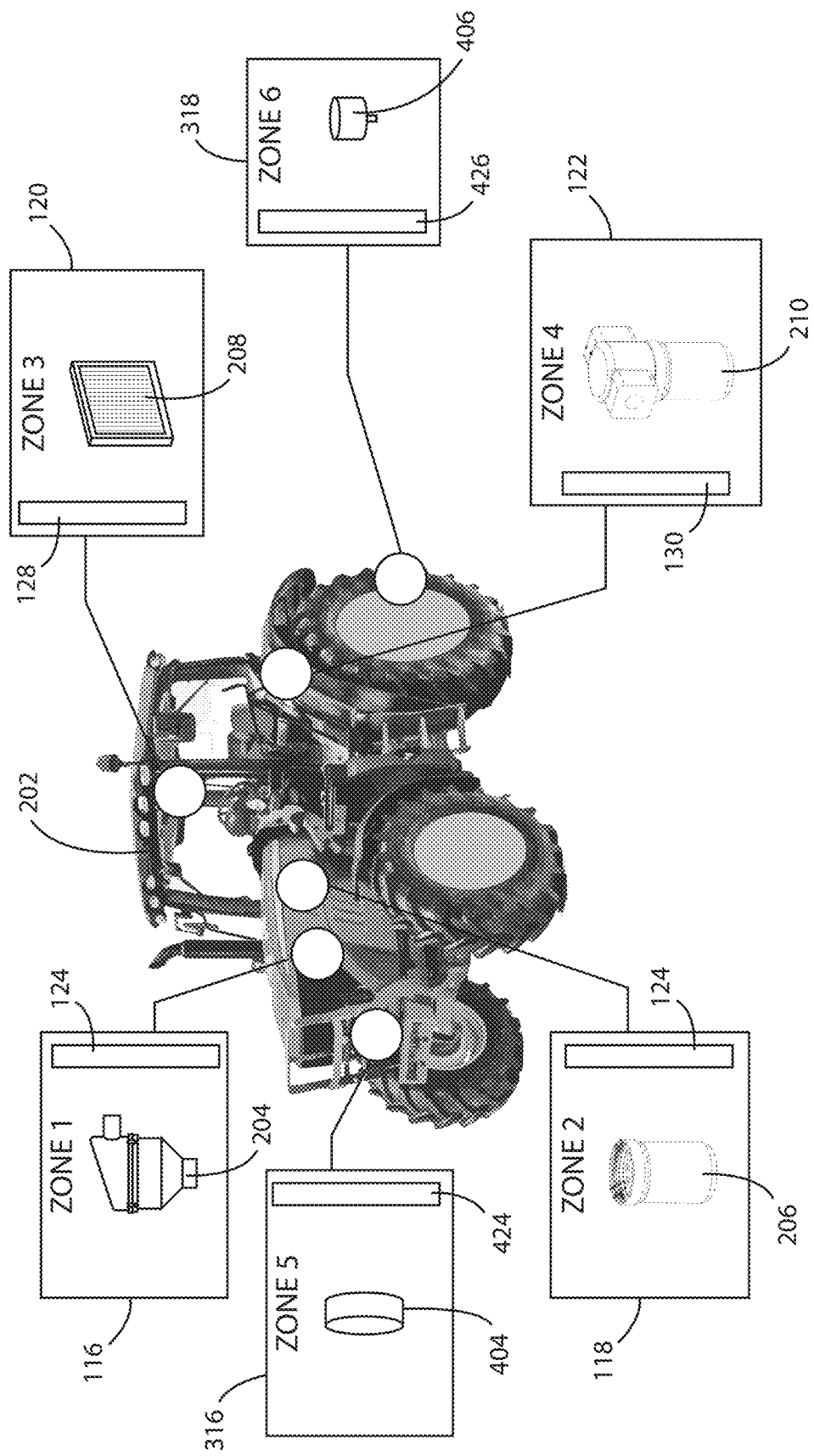
FIG. 4 a schematic view of a vehicle including a filtration monitoring system in accordance with various embodiments herein.

In addition, the filtration monitoring system 100 shown in FIG. 3 can also include a fifth zone 316 and a sixth zone 318. Referring now to FIG. 4, a schematic view is shown of a vehicle 202 including a filtration monitoring system in accordance with various embodiments herein.

Zones one, two, three and four can be as described above with respect to FIG. 2. The fifth zone 316 can include a proximity sensor system 404 and a fifth zone antenna 424. The proximity sensor system 404 can include a wireless communication tag (not shown) that can wirelessly communicate with the fifth zone antenna 424.

The sixth zone 318 can include an air pressure sensor system 406. The air pressure sensor system 406 can include a wireless communication tag (not shown) that can wirelessly communicate with a sixth zone antenna 426.

In cases where a wireless communication tag is mounted on a component that is removable from the zone (such as with a filter element that can be removed from a filter housing and taken away from the zone for cleaning or replacement) the wireless communication tag can pass outside of the zone and outside of an effective communication range with the respective zone antenna. Also, in some cases, as the wireless communication tag moves toward the boundary of the zone and away from the zone antenna, the signal strength can become weaker in a manner that can be quantified by the wireless communication reader.

Figure 5:
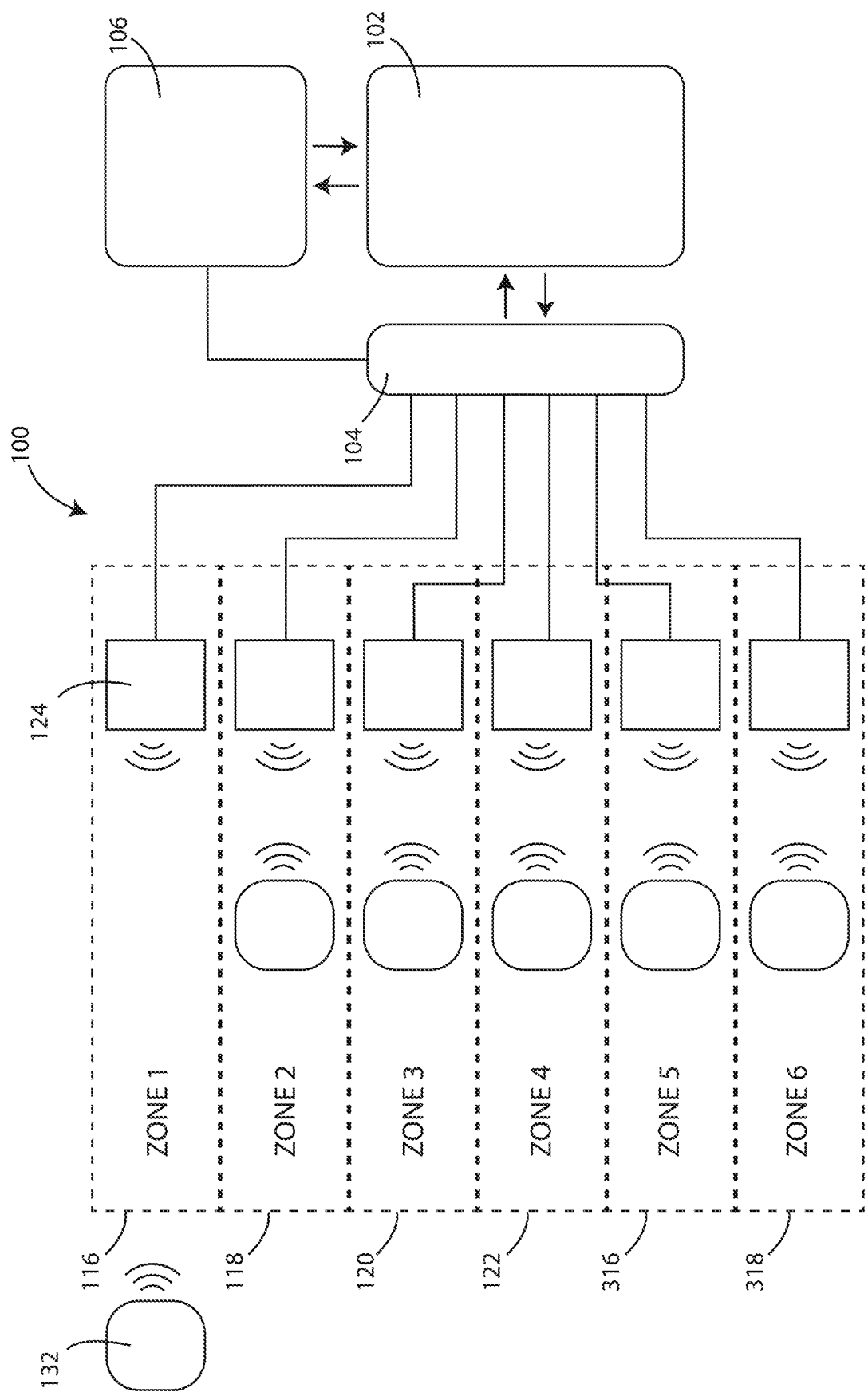
FIG. 5 is a schematic view of a filtration monitoring system in accordance with various embodiments herein.

Referring now to FIG. 5, a schematic view is shown of a filtration monitoring system 100 in accordance with various embodiments herein. The components of the system can be substantially as described with respect to FIGS. 1 and 3. In this example, the first wireless communication tag 132 has moved outside of the first zone 116 and out of communication with the first zone antenna 124.

It will be appreciated that in some scenarios a wireless communication tag can get moved into a position where it is overlapping with more than one zone and, therefore, within communication range of more than one zone antenna.

Figure 6:
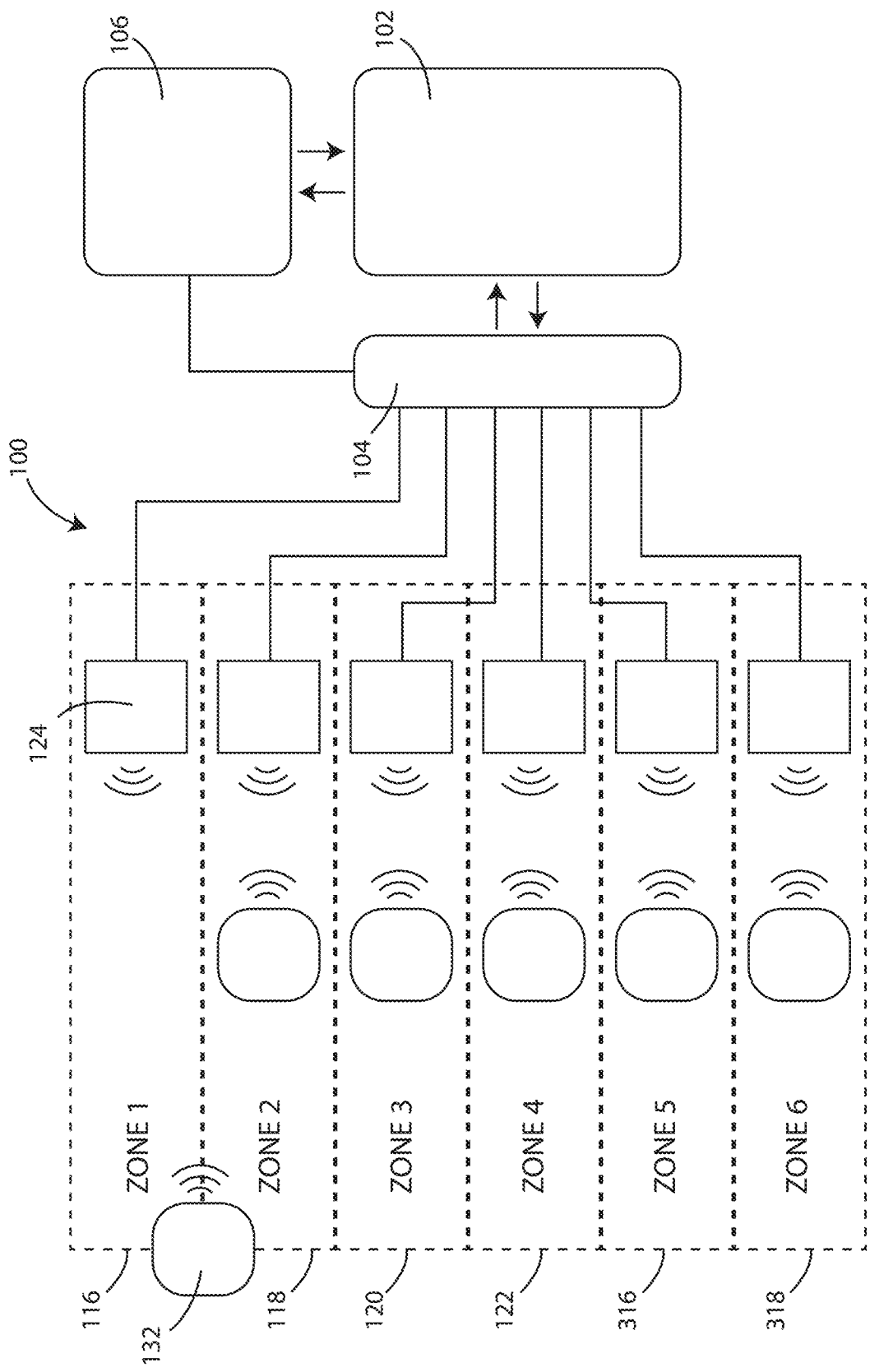
FIG. 6 is a schematic view of a filtration monitoring system in accordance with various embodiments herein.

Referring now to FIG. 6, a schematic view is shown of a filtration monitoring system 100 in accordance with various embodiments herein. The components of the system can be substantially as described with respect to FIGS. 1 and 3. In this example, the first wireless communication tag 132 has moved to an area overlapping the first zone 116 and the second zone 118, and therefore to a position where it can be in communication with both the first zone antenna 124 and the second zone antenna 126. By observing the presence of a particular wireless communication tag simultaneously with two separate zone antennas, the system can deduce the likely location of the wireless communication tag. Thus, in some embodiments, the system is configured to determine a present location of a wireless communication tag based on communication between the wireless communication tag and at least two spatially separate zone antennas.

By observing the presence of a particular wireless communication tag simultaneously with three separate zone antennas, the system can directly calculate the location of the wireless communication tag through a triangulation technique. Thus, in some embodiments, the system is configured to determine a present location of a wireless communication tag based on communication between the wireless communication tag and at least three spatially separate zone antennas.

It will be appreciated that zones herein can, in some embodiments, end at borders with other zones. However, in some embodiments, zones herein can overlap with one another. Thus, for example, in some embodiments at least one of the distinct communication channels is associated with a first filtration zone, but spatially overlaps with a second filtration zone. In some embodiments at least one of the distinct communication channels is associated with a first filtration zone, but spatially overlaps with a second and third filtration zone.

In some embodiments, zones can be set up such that there a single zone antenna for the zone. However, in other embodiments, zones can be set up such that there are multiple zone antennas for a particular zone. In addition, in some embodiments, zones can be set up such that there is typically only one wireless communication tag within the zone during normal operation. However, in some embodiments, zones can be set up such that there is typically more than one wireless communication tag within the zone during normal operation (such as with a filtration system that includes a plurality of filter elements).

Figure 7:
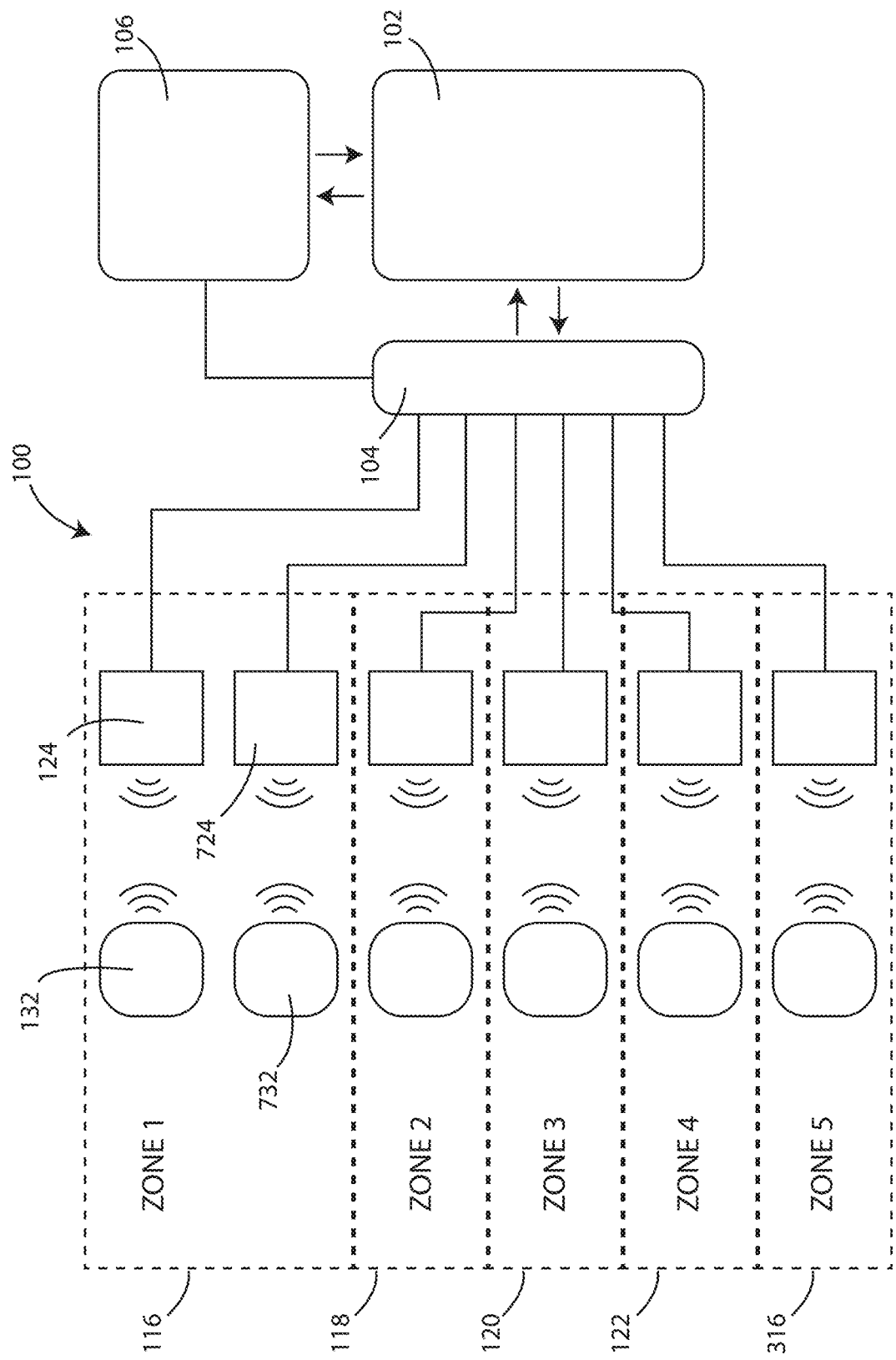
FIG. 7 is a schematic view of a filtration monitoring system in accordance with various embodiments herein.

Referring now to FIG. 7, a schematic view is shown of a filtration monitoring system 100 in accordance with various embodiments herein. The components of the system 100 can be substantially as described with respect to FIGS. 1 and 3. However, in this embodiment there are only five zones and the first zone 116 includes two first zone antennas 124, 724 and two first zone wireless communication tags 132, 732.

Figure 8:
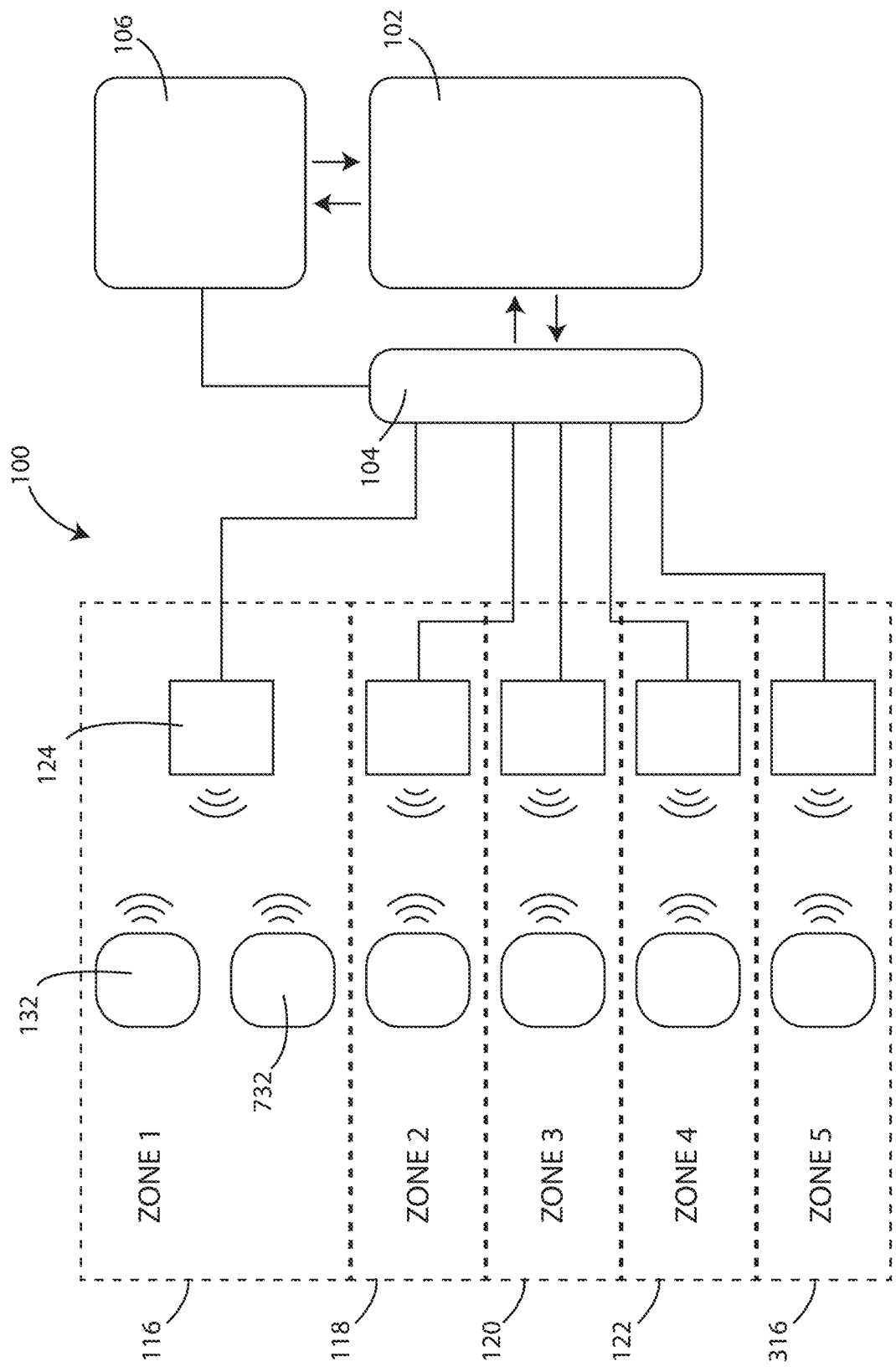
FIG. 8 is a schematic view of a filtration monitoring system in accordance with various embodiments herein.

Referring now to FIG. 8, a schematic view is shown of a filtration monitoring system 100 in accordance with various embodiments herein. The components of the system 100 can be substantially as described with respect to FIGS. 1 and 3. However, in this embodiment there are only five zones and the first zone 116 includes a single first zone antenna 124, but two first zone wireless communication tags 132, 732.

Figure 9:
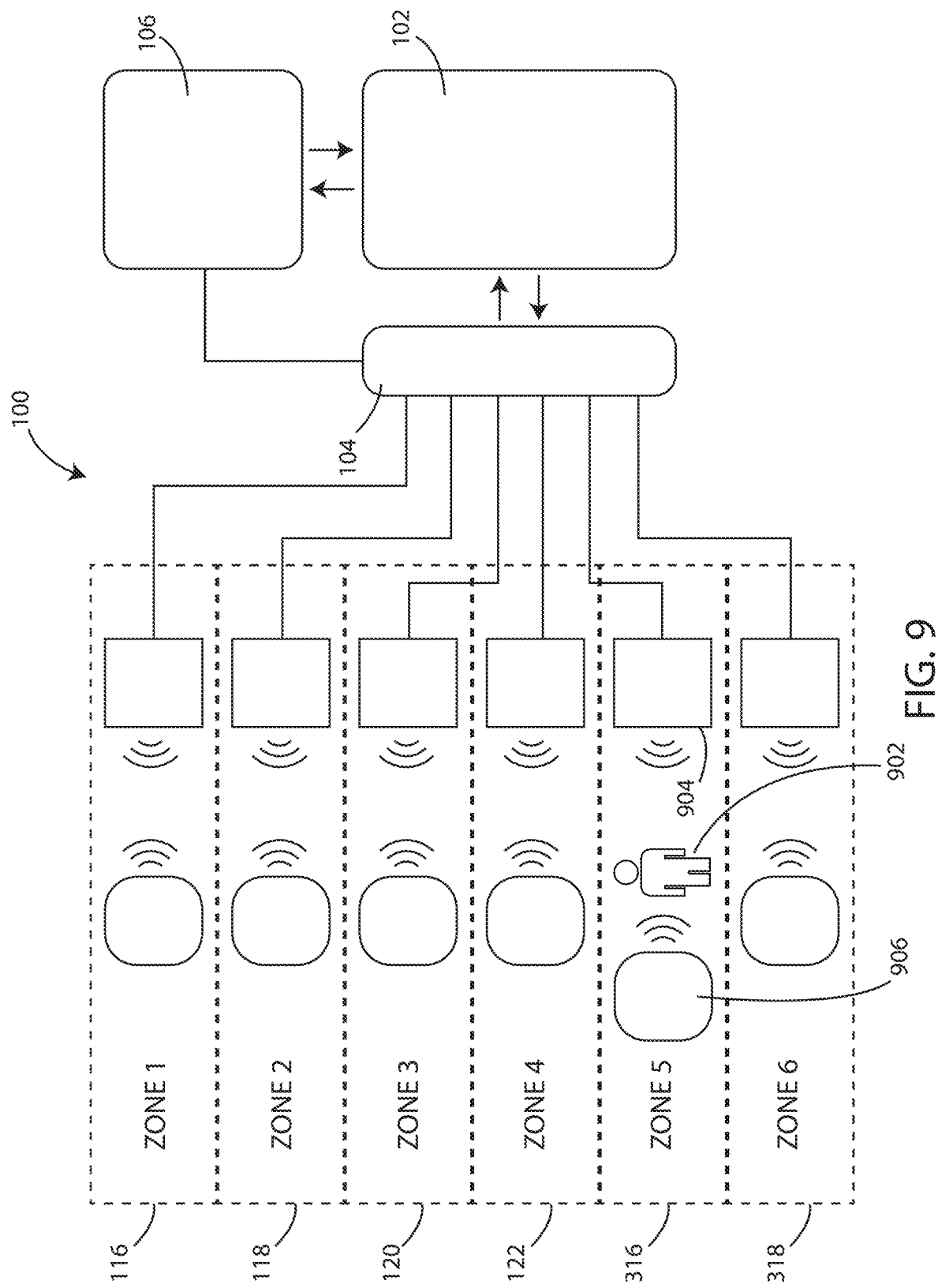
FIG. 9 is a schematic view of a filtration monitoring system in accordance with various embodiments herein.

In some cases, the presence of a human operator may influence observed signal strength within a field. Referring now to FIG. 9, a schematic view is shown of a filtration monitoring system 100 in accordance with various embodiments herein. The components of the system 100 can be substantially as described with respect to FIGS. 1 and 3. In this example, a human operator 902 is within the fifth zone 316 and between a fifth zone antenna 904 and a fifth wireless communication tag 906, causing attenuation of the signal. In this manner, communication between wireless communication tags and associated zone antennas can be used in order to determine the location of a human operator for safety purposes and/or for detecting the maintenance being performed on a filtration system.

In some embodiments, wireless communication tags may be directly associated with operators (such as in the form of a wireless communication enabled ID badge, or personal wireless communication device). In some embodiments, wireless communication tags can be associated with apparel or other equipment associated with an individual operator (e.g., "personal equipment" such as a safety vest, clothing, jacket, shoes/boots, gloves, a hard hat, and the like). As such, in various embodiments herein, a monitoring system can detect a specific individual or piece of equipment associated with a specific individual.

The system can determine the presence of an individual or a piece of personal equipment thereof within a particular zone. As such, the system can detect whether the operator is within a cab or other control zone of a vehicle. The system can also detect whether the operator is within a zone that may represent an operational risk (e.g., risk of injury to operator) and/or limit possible operational states of the vehicle and/or cause the vehicle to take certain actions based on operator location (e.g., disable power take-off when operator is within a PTO zone; engage parking brake when the operator is out of the cab, seat, or control zone of the vehicle; limit engine RPM when the operator is out of the cab, seat, or control zone of the vehicle; etc.). In some embodiments, vehicle controls (such as on a digital control panel) can be customized based on the particular operator that is detected. Thus, in various embodiments the system can be configured to send a command to limit vehicle operation and/or initiate a specific vehicle action when it detects that an operator is not within the cab area of the vehicle or the control zone of the vehicle. Such commands can be sent to a vehicle ECU system for execution or otherwise through a CAN bus network.

In some embodiments, operator presence within zones (or operator zone associations) can be tracked and stored by the system along with timestamps regarding the same. In some embodiments, other types of data that may be generated, tracked, or stored by the system herein (such as filtration system data, pressure data, etc.) can be classified or otherwise grouped based on the particular operator that was present during the period when such data was gathered. In this manner, the system can provide an indication of how system and/or vehicle performance may vary based on the particular operator that operated the equipment or vehicle.

Figure 10:
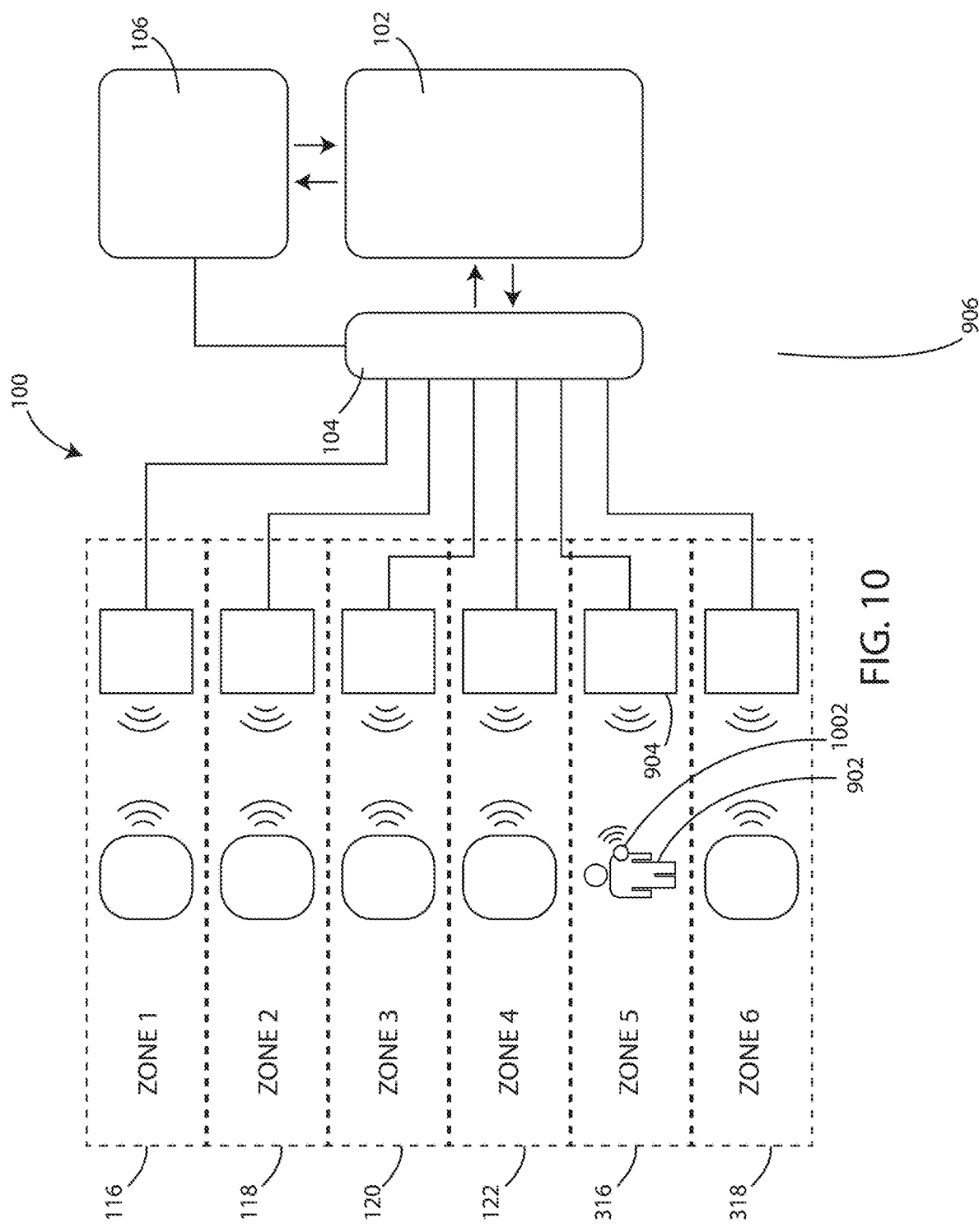
FIG. 10 is a schematic view of a filtration monitoring system in accordance with various embodiments herein.

Referring now to FIG. 10, a schematic view is shown of a filtration monitoring system 100 in accordance with various embodiments herein. The components of the system 100 can be substantially as described with respect to FIGS. 1 and 3. In this example, a human operator 902 is within the fifth zone 316. A wireless communication tag 1002 can be directly associated with the human operator 902. Thus, the presence of the human operator 902 in the fifth zone 316 can be detected by receiving a signal from the wireless communication tag 1002 with the fifth zone antenna 904. Detection of the presence of the human operator 902 in this zone can be stored as a type of zone association data by the system, in some cases along with a timestamp regarding the same. In some embodiments, the absence of the human operator 902 after previous detection can be stored as a type of zone association data by the system. By way of example, zone association data in accordance with embodiments herein can include both positive zone association data (wireless communication tag detected by an antenna) as well as negative zone association date (wireless communication tag not detected by an antenna).

In some cases, the presence of a particular material can interfere with the passage of electromagnetic waves and/or alter a property thereof such as frequency, amplitude, or the like. For example, water can substantially attenuate the passage of electromagnetic waves at various frequencies therethrough. Therefore, in accordance with embodiments herein, wireless signal strength between a wireless communication tag and an associated antenna can be monitored in order to detect a change in the amount of a signal attenuating or signal blocking material therebetween.

Figure 11:
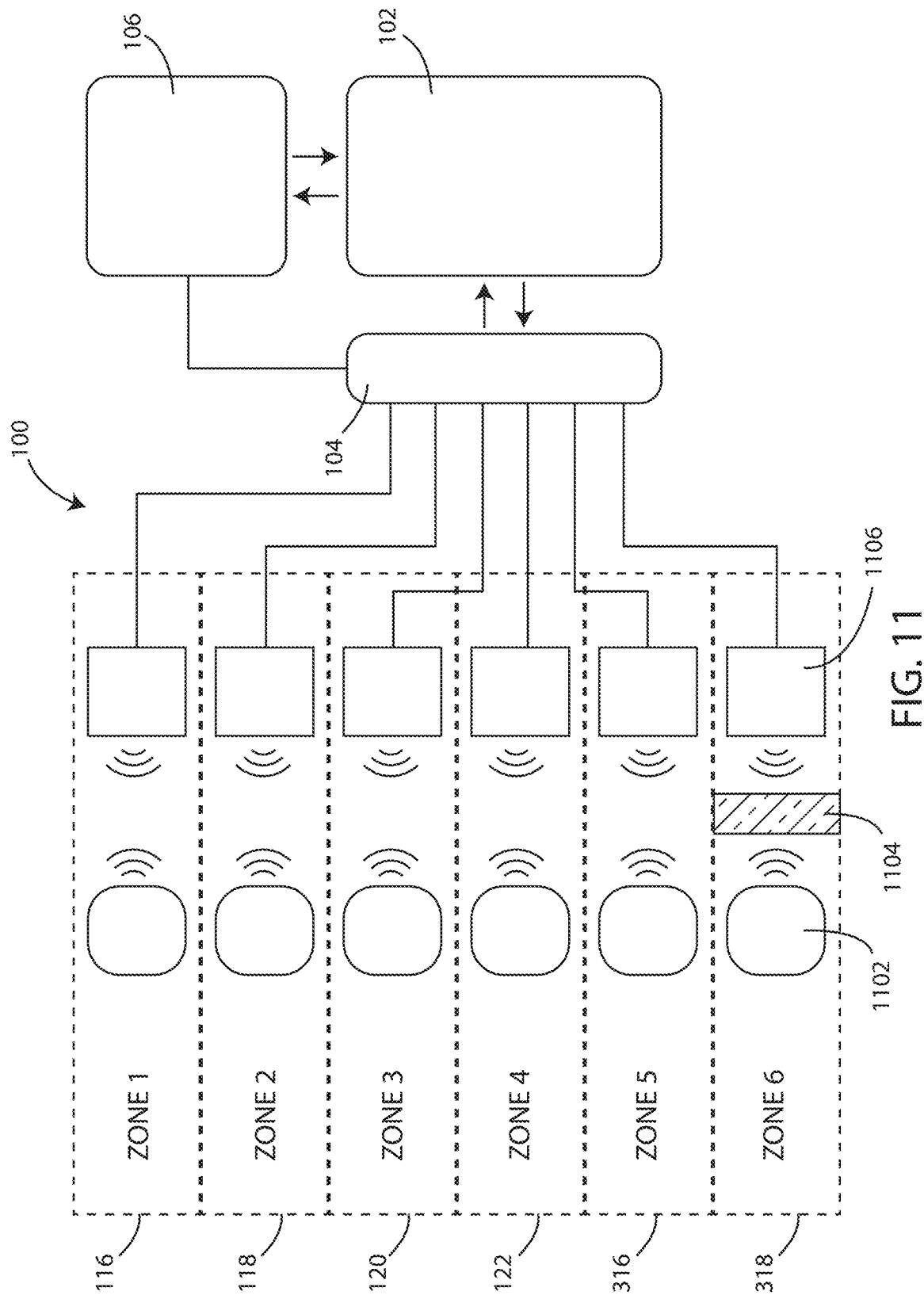
FIG. 11 is a schematic view of a filtration monitoring system in accordance with various embodiments herein.

Referring now to FIG. 11, a schematic view is shown of a filtration monitoring system 100 in accordance with various embodiments herein. The components of the system 100 can be substantially as described with respect to FIGS. 1 and 3. In this example, a measurement zone 1104 is disposed in a sixth zone 318 between a sixth antenna 1106 and a sixth wireless communication tag 1102.

In some embodiments, the measurement zone can cover at least a portion of a fuel tank, and thus the presence and/or level of fuel in the tank can be detected. In some embodiments, the measurement zone can cover at least a portion of a cab area of a vehicle, and thus the presence of a human operator within the cab area of the vehicle can be detected. In some embodiments, the measurement zone can cover at least a portion of a filter element, such as a portion thereof that collects dust or other debris thereon that is sufficient to alter, attenuate, or block the signal between a wireless communication tag and a zone antenna.

In some cases, monitoring systems herein can also include sensors or other signal generating components, placed within zones of the system, that are in wired or wireless communication with a wireless communication reader, a multiplexer, and/or a system control module.

Figure 12:
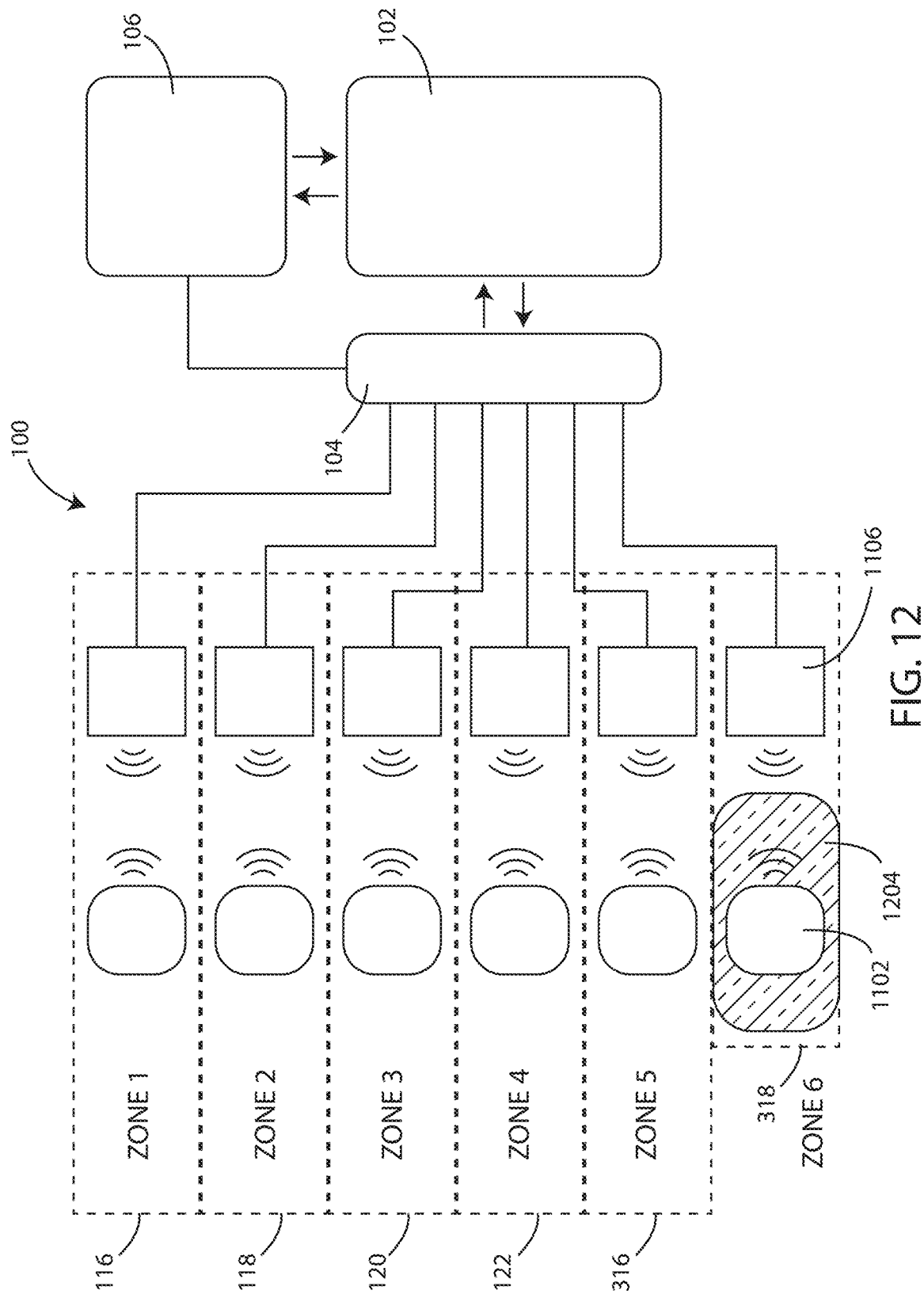
FIG. 12 is a schematic view of a filtration monitoring system in accordance with various embodiments herein.

As a specific example, referring now to FIG. 12, a schematic view is shown of a filtration monitoring system 100 in accordance with various embodiments herein. The components of the system 100 can be substantially as described with respect to FIGS. 1 and 3. In this example, a fuel tank 1204 (or other liquid tank) is disposed in a sixth zone 318. A sixth wireless communication tag 1102 can be disposed within or about the fuel tank 1204. The presence of fluids within the fuel tank 1204 can detectably alter communications (attenuate, shift, detune, etc.) between a sixth antenna 1106 and the sixth wireless communication tag 1102. As such, in various embodiments, the system can detect the presence and/or amount of a fluid within a fuel tank or other vessel (for storing fluids or other materials) by evaluating the signal received by the antenna from a wireless communication tag.

Figure 13:
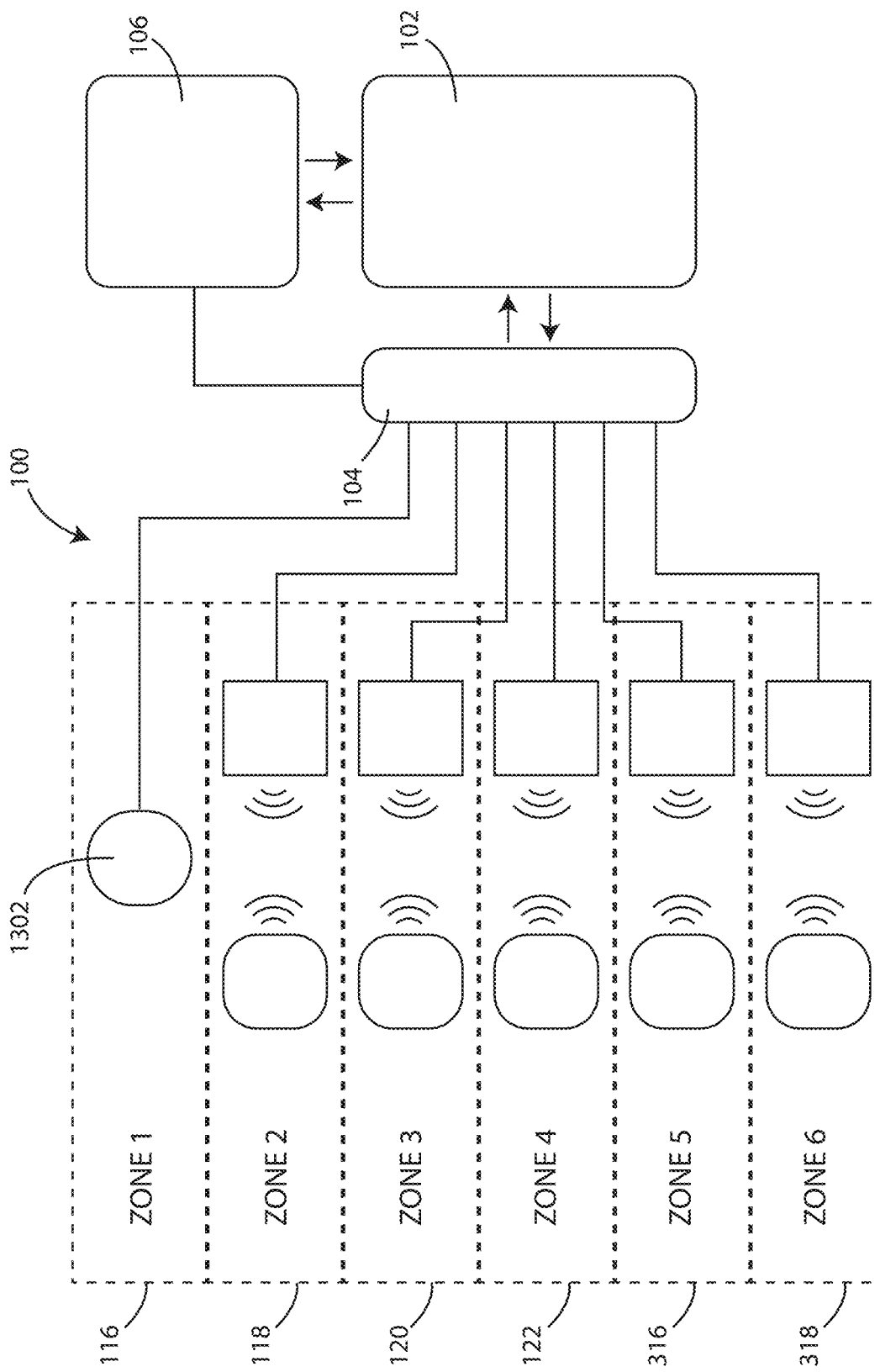
FIG. 13 is a schematic view of a filtration monitoring system in accordance with various embodiments herein.

Referring now to FIG. 13, a schematic view is shown of a filtration monitoring system 100 in accordance with various embodiments herein. The components of the system 100 can be substantially as described with respect to FIGS. 1 and 3. In this example, there is a sensor 1302 disposed within the first zone 116 that is in direct wired communication with the wireless communication reader 102 via the multiplexer 104. While not shown in this view, it will be appreciated that the first zone 116 can also include one or more zone antennas and one or more wireless communication tags. In various embodiments, the sensor 1302 can be in wireless communication with one or more zone antennas to send sensor data/signals (e.g., the sensor 1302 need not be limited to being a wired sensor). In some embodiments, the sensor 1302 can be a part of a wireless communication tag or send its data/signals through a wireless communication tag. In addition, the first zone 116 (and other zones) can include more than one wired signal generating component. In some cases, sensors or other signal generating components can be included within zones that communicate wirelessly through components other than a wireless communication tag.

Sensors herein can include, but are not limited to, pressure sensors, differential pressure sensors, proximity sensors, vibration sensors, accelerometers, optical sensors (including but not limited to particulate sensors), load sensors, flow sensors, and the like. In some embodiments, the sensor can be a part ID sensor (e.g., the sensor can provide a unique ID value that can be used to identify a particular part or type of part). Exemplary pressure sensors and differential pressure sensors herein can include, but are not limited to, MEMS-based pressure sensors, inductive pressure sensors, and piezoelectric pressure sensors. Exemplary vibration sensors and accelerometers herein can include, but are not limited to, 1, 2 and 3-axis accelerometers. Exemplary flow sensors herein can include, but are not limited to, turbine, paddle-wheel, vortex shedding, electromagnetic, and sonic/ultrasonic flow sensors.

Figure 14:
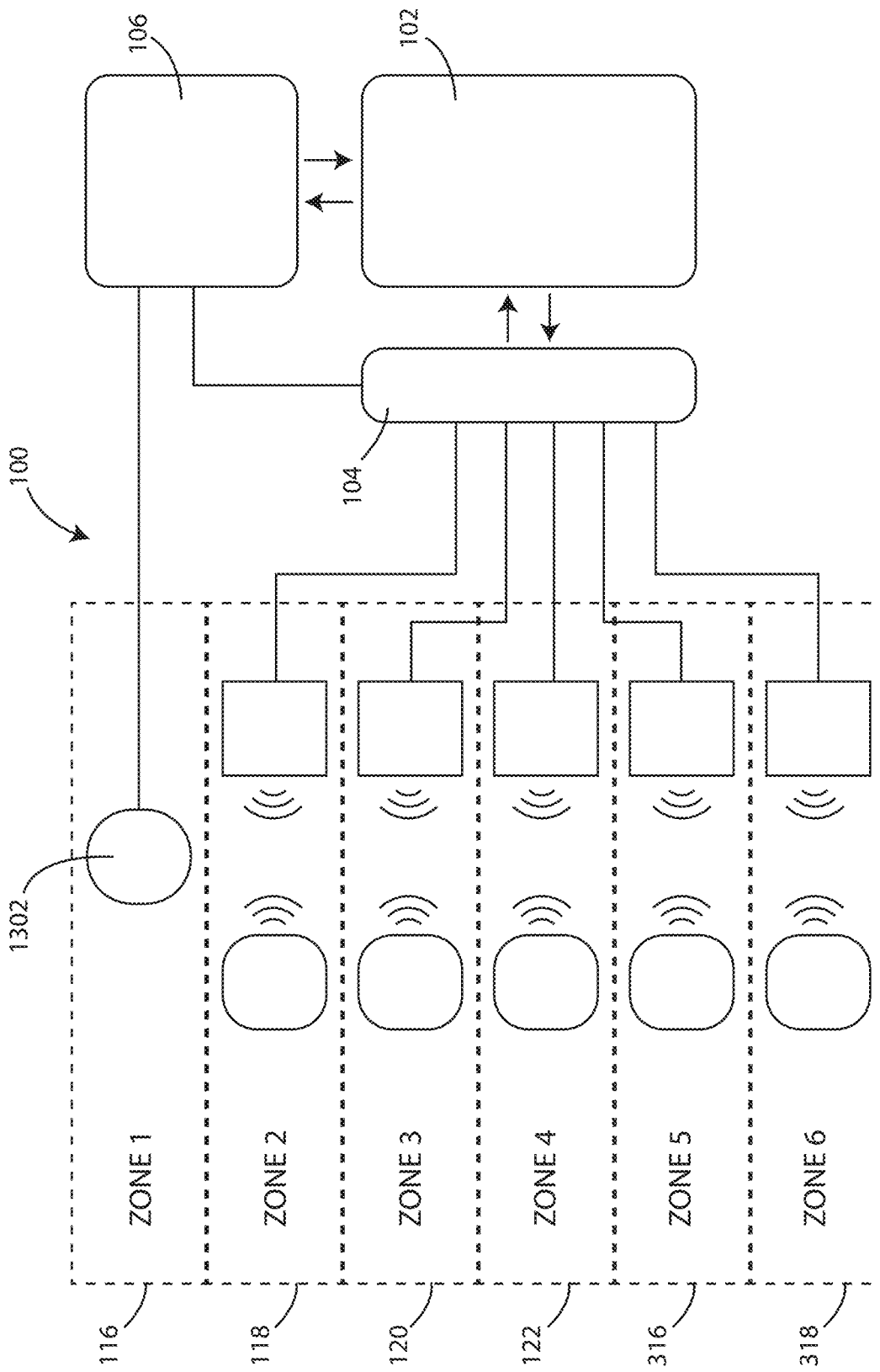
FIG. 14 is a schematic view of a filtration monitoring system in accordance with various embodiments herein.

In some embodiments, sensors or other signal generating components can be within a particular zone of the system and can be in wired communication directly to a system control module. Referring now to FIG. 14, a schematic view is shown of a filtration monitoring system 100 in accordance with various embodiments herein. The components of the system 100 can be substantially as described with respect to FIGS. 1 and 3. In this example, there is a sensor 1302 disposed within the first zone 116 that is in direct wired communication with the system control module 106 via the multiplexer 104.

Many different types of filtration systems can be a part of or be monitored by filtration monitoring systems herein.

Figure 15:
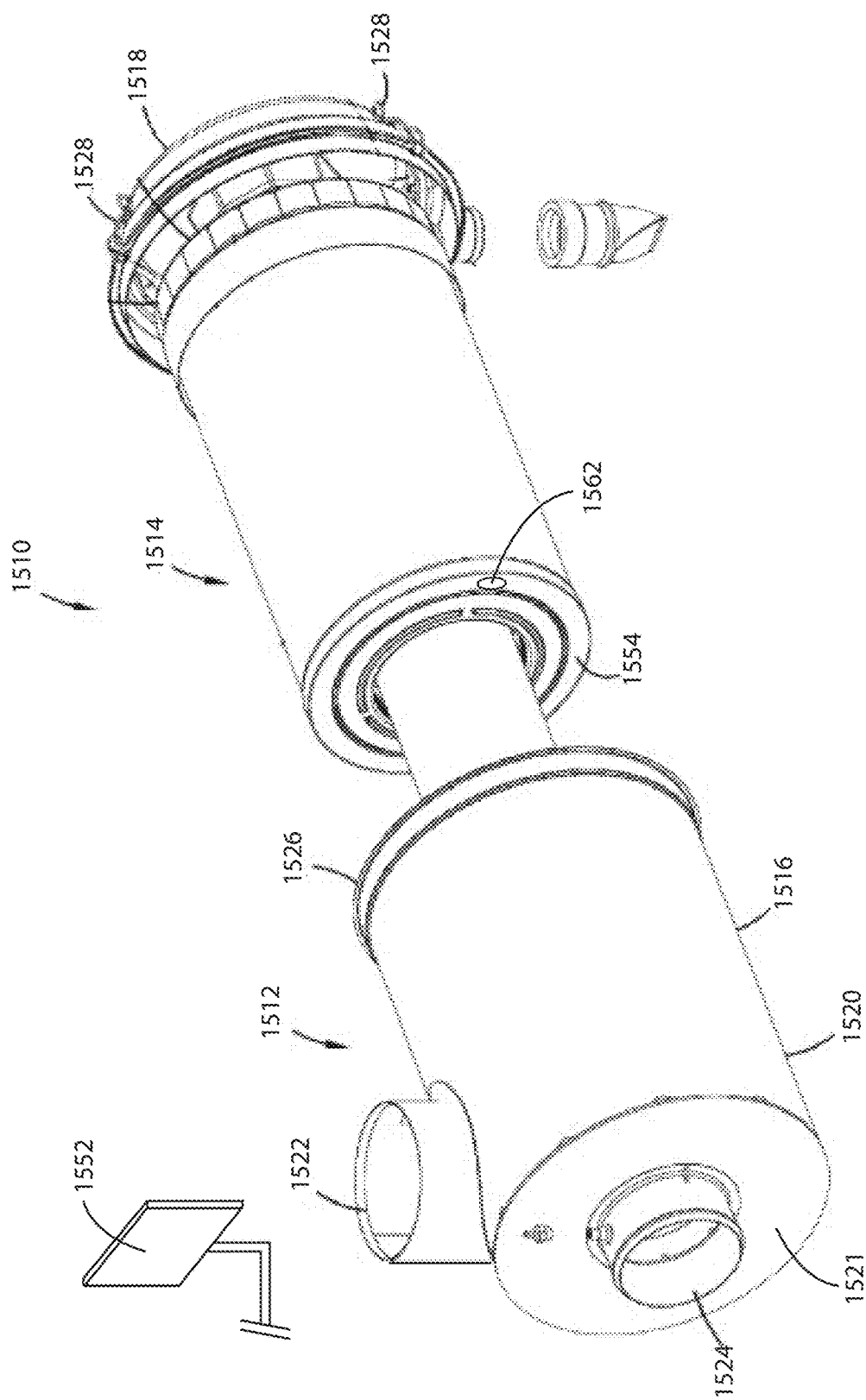
FIG. 15 is a schematic view of a filtration system including a filter housing and filter element in accordance with various embodiments herein.

Referring now to FIG. 15, a schematic view is shown of a filtration system 1510 including a filter housing and filter element in accordance with various embodiments herein. The filtration system 1510 depicted includes a housing 1512 and a removable and replaceable primary filter element 1514. In the one shown, the housing 1512 includes a housing body 1516 and a removable service cover 1518. The cover 1518 provides for service access to an interior of the housing body 1516 for servicing. For a filtration system 1510 of the general type depicted in FIG. 15, servicing generally involves dismounting and removing from the housing 1512 at least one filter element, such as filter element 1514 depicted, either for refurbishing or replacement.

The housing 1512 depicted includes an outer wall 1520 having an end 1521, an air inlet 1522, and an air outlet 1524. For the embodiment depicted, the inlet 1522 and the outlet 1524 are both in the housing body 1516. In other embodiments, at least one of the inlet 1522 or outlet 1524 can be part of the cover 1518. In typical use, ambient or unfiltered air enters the filtration system 1510 through the inlet 1522. Within the filtration system 1510, the air is passed through the filter element 1514 to obtain a desirable level of particulate removal. The filtered air then passes outwardly from the filtration system 1510 through the outlet 1524 and is directed by appropriate duct work or conduits to an inlet of an air intake for an associated engine, or compressor, or other system.

While FIG. 15 describes a filter element for particulate removal, it will be appreciated that embodiments herein can also including filter systems and/or filter elements for removal of gas phase and/or liquid phase contaminants.

The particular filtration system 1510 depicted has outer wall 1520 defining a barrel shape or generally cylindrical configuration. In this particular configuration, the outlet 1524 can be described as an axial outlet because it generally extends in the direction of and circumscribes a longitudinal central axis defined by the filter element 1514. The service cover 1518 generally fits over an open end 1526 of the housing body 1516. In the particular arrangement shown, the cover 1518 is secured in place over the end 1526 by latches 1528.

FIG. 15 also shows a wireless communication tag 1562 disposed on the first end cap 1554 of the filter element 1514. FIG. 15 also shows a zone antenna 1552. The wireless communication tag 1562 and zone antenna 1552 can be in wireless communication with one another.

In various embodiments herein, a wireless communication tag can also be disposed on or otherwise associated with the filter housing itself (e.g., versus the filter element). A wireless communication tag on the filter housing can be in addition to, or in replace of, a wireless communication tag on the filter element. The wireless communication tag on the filter housing can be used to identify the type or model of filter housing (e.g., such data can be stored on the tag and then wireless transmitted) and thus can be used to identify the proper model/type of filter element that should be fitted therein or therewith.

Figure 16:
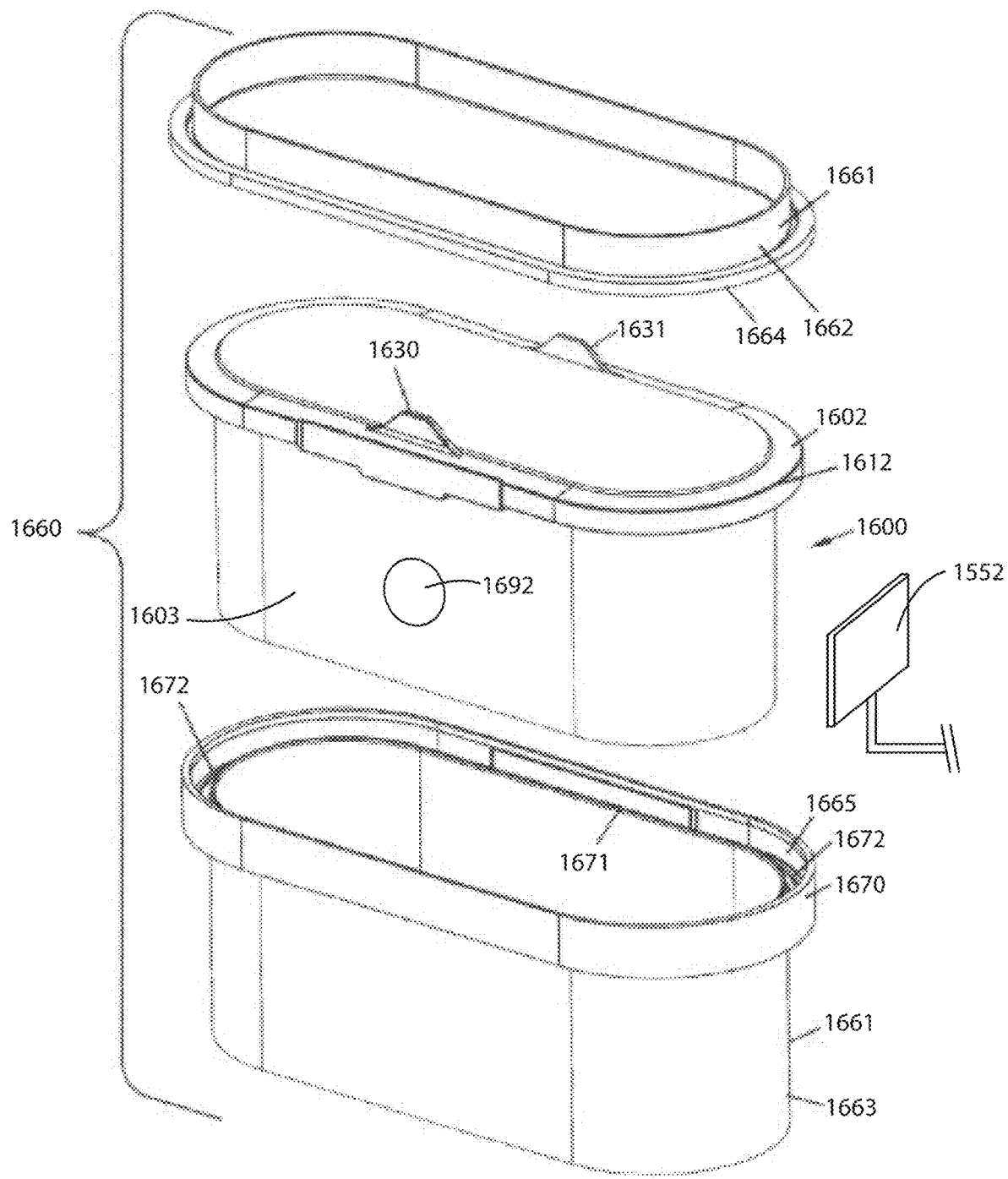
FIG. 16 is a schematic view of a filtration system including a filter housing and filter element in accordance with various embodiments herein.

Referring now to FIG. 16, a schematic view is shown of a filtration system 1660 including a filter housing and filter element in accordance with various embodiments herein. The filtration system 1660 can include a housing 1661 having housing sections 1662, 1663 between which axial housing seal arrangement 1602 would be positioned, and pinched, during installation. One of the housing sections 1663 will typically be a filter element receiver, and will include a receiving trough 1665 therein, into which seal arrangement 1602 is fit during installation. A second housing section 1663 would generally include a pressure flange 1664 oriented to apply pressure to a surface during installation, helping to ensure that the seal surface is pressed, to adequately pinch seal member 1612 against shelf or seal surface portions of trough 1665 for sealing. Various retention mechanisms such as bolts or over center latches can be used to apply and retain the force.

Still referring to FIG. 16, housing section 1663 includes a seal region outer perimeter rim 1670, which can surround seal arrangement 1602 and project therefrom in the same direction as optional handle members 1630, 1631, during installation. Filter element 1600 can recess within rim 1670.

Still referring to FIG. 16, the housing section 1663 also includes a seal region inner perimeter rim 1671, surrounding by rim 1670 and spaced therefrom by trough 1672 which includes a seal engagement surface. Rim 1671 is optional, but preferred. It will typically be positioned so that a portion of the seal arrangement or member 1612 will be positioned between rim 1671 and rim 1670, when the filter element 1600 is property installed.

A wireless communication tag 1692 can be associated with, such as disposed on or in, the filter element 1600. In particular, the wireless communication tag 1692 can be disposed on or in a side wall 1603 of the filter element 1600 or on or in another component of the filter element 1600. FIG. 16 also shows a zone antenna 1552. The wireless communication tag 1692 and zone antenna 1552 can be in wireless communication with one another.

It is noted that the housing 1662 of FIG. 16 is schematic. The housing can also have additional features relating to its installation, air flow inlet, air flow outlet, etc. Also, the wireless communication tag 1692 can be in many different specific positions, such as on the inside of filter element 1600 or within or between other components of the filter element 1600 or filter system.

Figure 17:
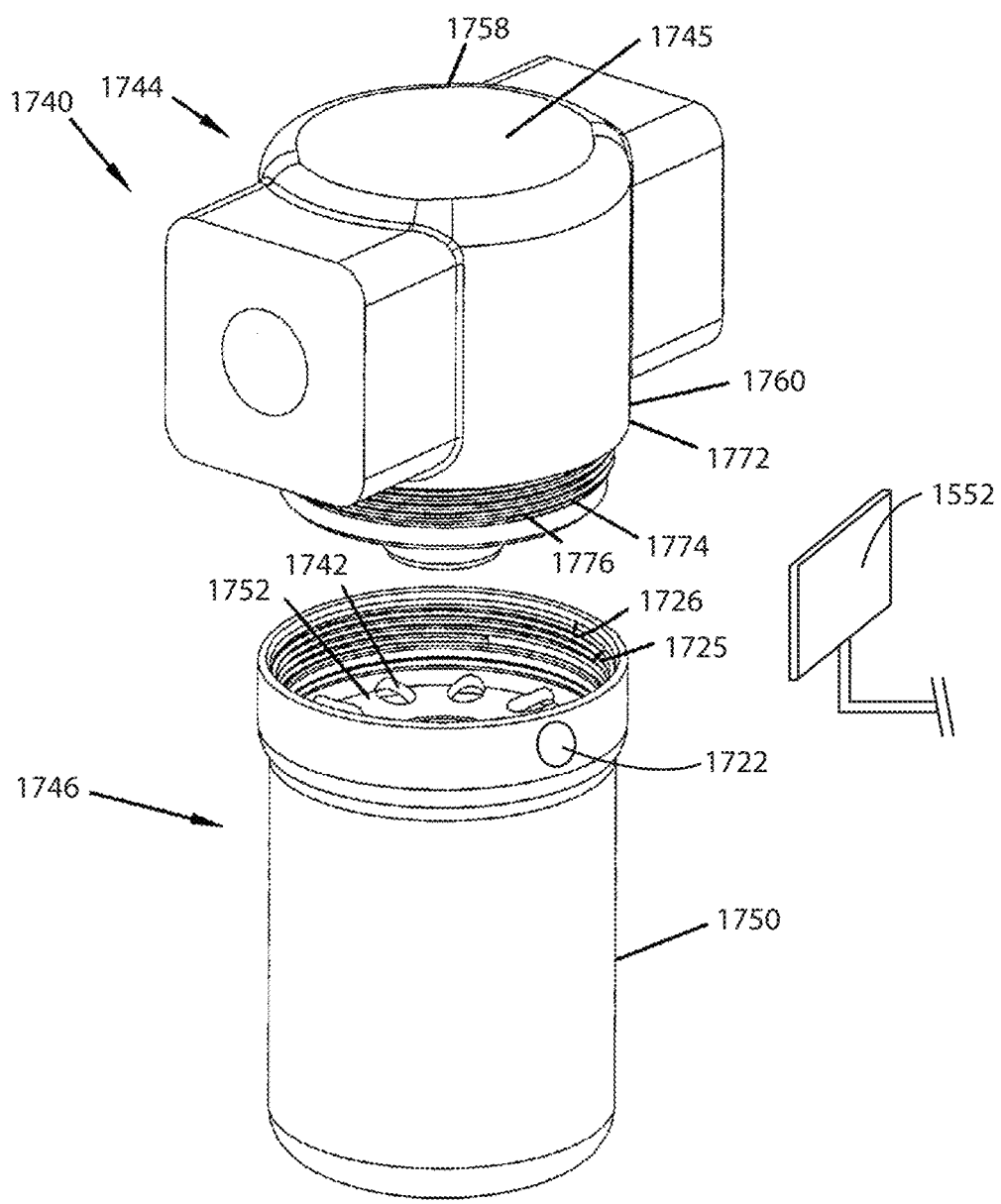
FIG. 17 is a schematic view of a filtration system including a filter head and a spin-on canister filter in accordance with various embodiments herein.

Referring now to FIG. 17, a schematic view is shown of a filtration system 1740 including a filter head 1744 and a spin-on canister filter 1746 (or filter element). The filter head 1744 is capable of operably receiving both spin-on canister filter 1746 and a bowl-cartridge filter (not shown). By "operably receiving", it is meant that the filter head 1744 includes appropriate structure for engaging the spin-on canister filter 1746, such that fluid to be cleaned is directed through the appropriate channels and cleans the fluid as intended. In reference to FIG. 17, the spin-on canister filter 1746 includes single-use housing 1750 and baffle plate 1752. The housing 1750 defines a filter interior permanently holding a non-replaceable cartridge filter (filter element). In some embodiments, the filter head 1744 includes an end face 1745.

The baffle plate 1752 includes a plurality of apertures 1742 to permit fluid flow from the filter head 1744 into the interior volume of the spin-on canister filter 1746.

The filter head 1744 includes a block 1758 including a continuous exterior wall member 1760 forming an outer tube surrounding an internal volume. The filter head block 1758 can define a first port, which in forward flow systems is an inlet port, and a second port, which in forward flow systems is an outlet port, and an interior or center tube, which is within the internal volume and is circumscribed by the outer tube.

In some embodiments, the outside surface 1772 can have first mechanical connection structure 1774. The first mechanical connection structure 1774 includes many types of arrangements. Of those arrangements possible, examples include threads, bayonet connections, bead and groove connections, etc. In the particular embodiment illustrated, the first connection structure 1774 includes a first plurality of threads 1776. In this particular embodiment, the first plurality of threads 1776 is located on the outside surface 1772 of the wall member 1760. However, in other embodiments, the first plurality of threads can be located along the inside surface of the wall member 1760.

The spin-on canister filter 1746 can include a second mechanical connection structure 1725, which in this case, is depicted as threads 1726. The threads 1726 engage the first plurality of threads 1776.

A wireless communication tag 1722 can be associated with, such as disposed on or in, the spin-on canister filter 1746. FIG. 16 also shows a zone antenna 1552. The wireless communication tag 1722 and zone antenna 1552 can be in wireless communication with one another. In some embodiments, the wireless communication tag 1722 can be positioned such that signals between the tag 1722 and the antenna 1552 are blocked or distinguishably attenuated under certain circumstances. For example, the wireless communication tag 1722 can be positioned such that it is shielded by a metal housing (such as provided by the filter head) when the spin-on canister filter 1746 is fully mounted, such that communication by the tag is only possibly when the spin-on canister filter 1746 is removed or being removed. In this manner, the presence or absence of communication can be used to detect an event such as filter removal or replacement.

Further aspects of spin-on canister filters are described in U.S. Publ. Pat. Appl. No. 2004/0079693, the content of which is herein incorporated by reference.

Figure 18:
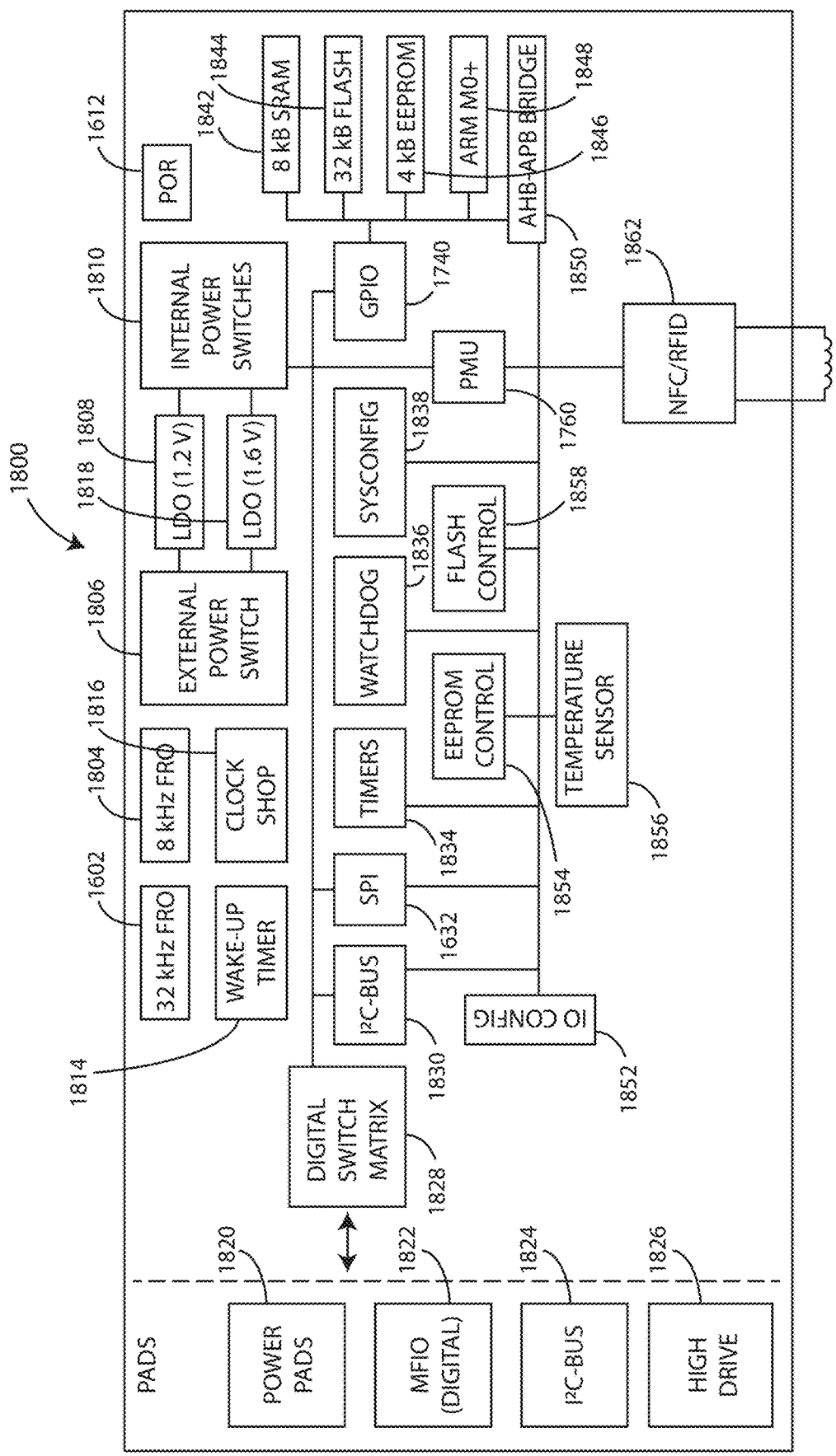
FIG. 18 is a schematic view of a wireless communication reader in accordance with various embodiments herein.

Referring now to FIG. 18, a schematic block diagram is shown of a wireless communication reader 1800 in accordance with various embodiments herein. The wireless communication reader 1800 can include components such as 32 kHz free running oscillator (FRO) 1602, 8 kHz FRO 1804, external power switch 1806, 1.2 V low dropout (LDO) voltage regulator 1808, internal power switches 1810, power-on reset (POR) 1612, wake up timer 1814, clock shop 1816, 1.6 V LDO voltage regulator 1818, power pads 1820, digital multi-functional I/O (MFIO) pads 1822, I²C bus pads 1824, high drive pads 1826, digital switch matrix 1828, I²C bus 1830, serial peripheral interface (SPI) 1632, timers 1834, watchdog 1836, system configuration module 1838, general purpose I/O (GPIO) 1740, 8 kB SRAM 1842, 32 kB flash 1844, 4 kB EEPROM 1846, ARM M0+ processor 1848, advance high-performance bus—advanced peripheral bus AHB-APB bridge 1850, I/O configuration module 1852, EEPROM control unit 1854, temperature sensor 1856, flash memory control unit 1858, phasor measurement unit (PMU) 1760, and NFC/RFID unit 1862. An exemplary wireless communication reader 1800 includes the NHS3100 integrated circuit, available from NXP Semiconductors. However, many other units can also be used. Further, wireless communication readers herein can include fewer components than shown in FIG. 18 or additional components.

Figure 19:
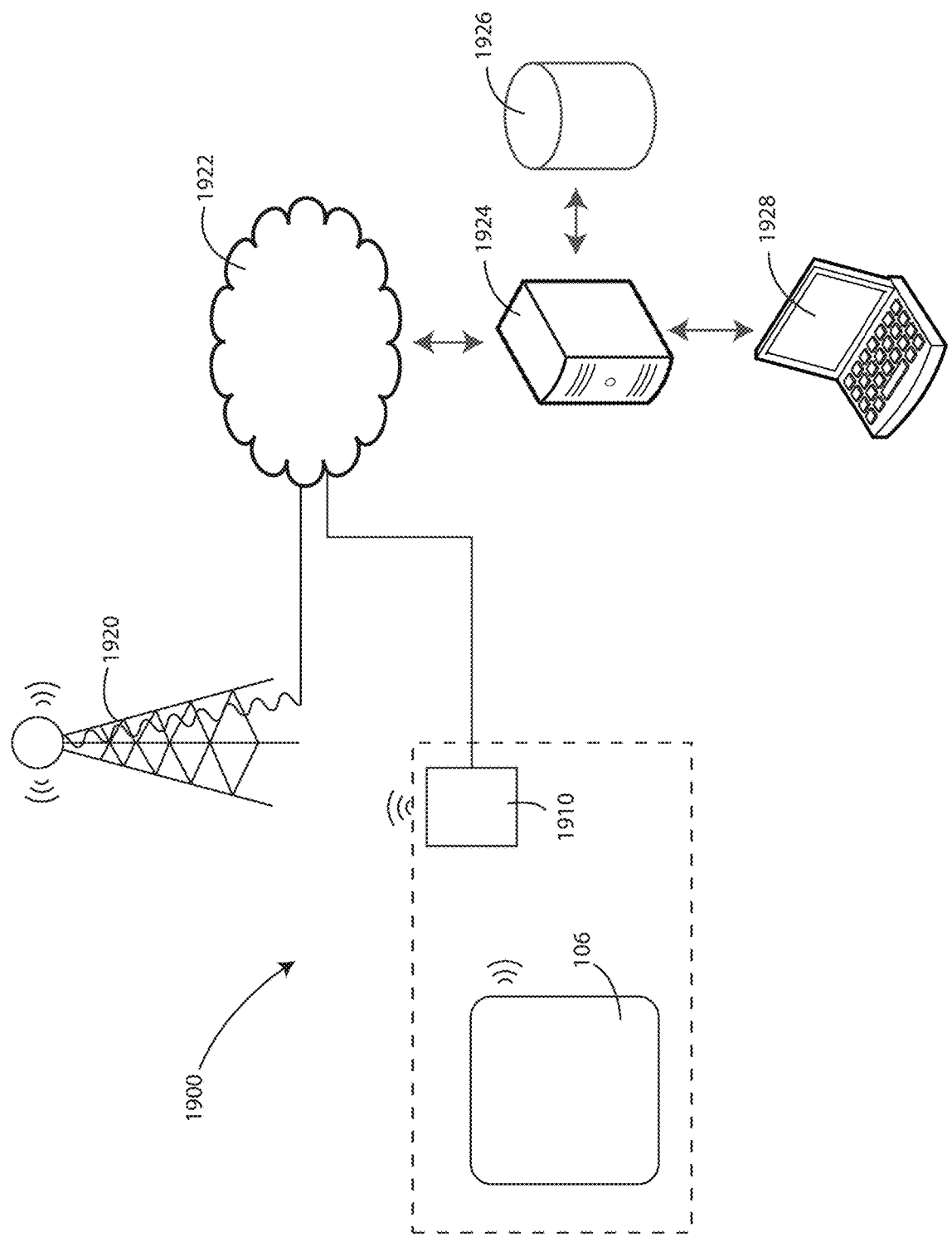
FIG. 19 is a schematic view of a communication network for a filtration monitoring system in accordance with various embodiments herein.

Referring now to FIG. 19, a schematic view is shown of a communication network 1900 for a filtration monitoring system in accordance with various embodiments herein. A system control module 106 can be in communication with a gateway or repeater unit 1910. In some embodiments, the gateway or repeater unit 1910 can be connected to an external data network 1922, such as the Internet or various private networks. In some embodiments, the data network 1922 can be a packet-switched network. In some embodiments, the gateway or repeater unit 1910 can also include data network router functionality.

In some embodiments, wireless signals from one or more of the components such as the system control module 106 or gateway or repeater unit 1910, can be exchanged with a wireless communication tower 1920 (or antenna array), which could be a cellular tower or other wireless communication tower. The wireless communication tower 1920 can be connected to a data network 1922, such as the Internet or another type of public or private data network, packet-switched or otherwise.

The data network can provide for one-way or two-way communication with other components. For example, a server 1924 or other processing device can receive electronic signals containing data from one or more components such as the system control module 106, gateway or repeater unit 1910, or the like. The server 1924 can interface with a database 1926 to store data. In some embodiments, the server 1924 (or a particular device that is part of the server system) can interface with a user device 1928, which can allow a user to query data stored in the database 1926.

Methods

Many different methods are contemplated herein, including, but not limited to, methods of making, methods of using, and the like. Aspects of system/device operation described elsewhere herein can be performed as operations of one or more methods in accordance with various embodiments herein.

In an embodiment, a method of monitoring filtration system operations is included. The method can include receiving signals from a plurality of wireless communication tags with a plurality of zone antennas associated with a plurality of zones and conveying the signals from the zone antennas to a wireless communication reader.

In an embodiment, the method can further include evaluating the signals for signal strength. In an embodiment, the method can further include evaluating the signals for patterns indicative of filtration system operational events. In an embodiment, the filtration system operational events can include at least one of a filter element removal, a filter element installation, a filter element reinstallation, a filter cleaning event.

In an embodiment of the method, detection of a wireless communication tag exiting a zone and then reentering a zone is counted as a filter element removal and/or a filter reinstallation event.

Wireless Communication

In accordance with various embodiments herein, zone antennas can be in wireless communication with wireless communication tags.

Various frequencies can be used herein for transmissions between wireless communication tags and antennas. In some embodiments, the transmission can be at an ultra-high frequency (UHF). The UHF range includes frequencies from 300 to 1000 MHz. However, in some embodiments herein, 433 MHz and/or 860-960 MHz, are used. Other frequencies herein can include 70-74 MHz, 170-220 MHz, 580-800 MHz, 900 MHz, 2402-2480 MHz, 2400-2483.5 MHz, 2.4 GHz, 3.6 Ghz, 4.9 Ghz, 5 Ghz and 5.9 Ghz. Many different frequencies are contemplated Various communication protocols can be used. In some embodiments, an RFID protocol can be used. In some embodiments, ISO 18000-6A, ISO 18000-6B, ISO 18000-6C, or ISO 18000-630 can be used. In some embodiments, a custom protocol (e.g., not conforming to a standard) can be used. In some embodiments, a BLUETOOTH or BLUETOOTH Low-Energy protocol can be used. In some embodiments, a WIFI protocol can be used. Other protocols can include ZigBee, Z-Wave, 6LoWPAN, Thread, WiFi-ah, GSM, TDMA, 3G, 4G, 5G, LTE, LTE-M1, NB-IoT, NFC, SigFox, LoRaWAN, Ingenu, Weightless-N, P, W, ANT, DigiMesh, MiWi, EnOcean, Dash7, WirelessHART, and the like.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A filtration monitoring system comprising:
a plurality of fluid filtration housings;
a plurality of fluid filter elements associated with the fluid filtration housings;
a plurality of wireless communication tags associated with the fluid filter elements;
a plurality of zone antennas configured to cover different spatial zones; and
a wireless communication reader in wired communication with the plurality of zone antennas, the wireless communication reader configured to wirelessly send data to and receive data from the wireless communication tags via the zone antennas.

2. The filtration monitoring system of claim 1, the zone antennas forming components of distinct communication channels, the wireless communication reader further comprising a multiplexer to switch between distinct communication channels.

3. The filtration monitoring system of claim 2, the distinct communication channels associated with different fluid filtration housings.

4. The filtration monitoring system of claim 2, the distinct communication channels associated with different filtration zones.

5. The filtration monitoring system of claim 2, wherein at least one of the distinct communication channels is associated with a first filtration zone, but spatially overlaps with a second filtration zone.

6. The filtration monitoring system of claim 1, the zone antennas comprising UHF antennas.

7. The filtration monitoring system of claim 1, wherein at least one of the zone antennas is different in its effective communication range.

8. The filtration monitoring system of claim 1, wherein at least one of the zone antennas has a directionality that is different than one or more of the other zone antennas.

9. The filtration monitoring system of claim 1, wherein the wireless communication reader calculates a signal strength between the antennas and the wireless communication tags.

10. The filtration monitoring system of claim 9, wherein the signal strength reflects a distance between the zone antennas and the wireless communication tags.

11. The filtration monitoring system of claim 1, further comprising a system controller, the system controller configured to receive electrical signals from the wireless communication reader, the system controller configured to identify patterns in the electrical signals received from the wireless communication reader.

12. The filtration monitoring system of claim 11, the system controller configured to identify patterns indicative of a filtration system operational event.

13. The filtration monitoring system of claim 11, the filtration system operation event including at least one of a fluid filter element removal, a fluid filter element installation, a fluid filter element reinstallation, a fluid filter cleaning event.

14. The filtration monitoring system of claim 11, the system controller configured to identify patterns in the electrical signals received from the wireless communication reader; wherein detection of a wireless communication tag exiting a zone and then reentering a zone is counted as a fluid filter element removal and/or a fluid filter reinstallation event.

15. The filtration monitoring system of claim 14, the system configured to increment and store a count of detected fluid filter element removal and/or reinstallation events.

16. The filtration monitoring system of claim 15, the count of detected fluid filter element removal or reinstallation events configured to be stored in a memory circuit that is part of the wireless communication tag.

17. The filtration monitoring system of claim 1, further comprising a sensor associated with a zone and in wired communication with at least one of the wireless communication tags, at least one of the zone antennas, or the wireless communication reader.

18. The filtration monitoring system of claim 1, the wireless communication tag comprising a memory storage circuit.

19. The filtration monitoring system of claim 18, wherein the wireless communication tag stores information regarding fluid filter element model and serial number in the memory storage circuit.

20. The filtration monitoring system of claim 1, wherein electrical properties of wired communication between the wireless communication reader and the zone antennas distinguishably varies based on electrical properties of electrical conductors interconnecting the wireless communication reader and the zone antennas.

21. The filtration monitoring system of claim 1, wherein the filtration monitoring system is configured to determine a present location of a wireless communication tag based on communication between the wireless communication tag and at least two spatially separate zone antennas.

22. The filtration monitoring system of claim 1, wherein the filtration monitoring system is configured to store data including unique tag IDs, the zones the unique tag IDs have been located in, and timestamps regarding the same.

23. The filtration monitoring system of claim 1, wherein at least one of the wireless communication tags is associated with an air intake filtration system, a fuel filtration system, a cabin air filtration system, or a lubricating oil filtration system.

24. The filtration monitoring system of claim 1, further comprising a wireless communication tag associated with a human operator, the wireless communication tag configured to communicate with at least one of the spatial zone antennas.

* * * * *